US011042692B1

(12) United States Patent
Greisen et al.

(10) Patent No.: US 11,042,692 B1
(45) Date of Patent: Jun. 22, 2021

(54) ARTIFICIAL INTELLIGENCE-BASED LEGISLATIVE CODE VALIDATION AND PUBLICATION SYSTEM

(71) Applicant: Open Law Library, Washington, DC (US)

(72) Inventors: David Jonathon Greisen, Washington, DC (US); Vincent Quincy Chuang, Los Altos, CA (US)

(73) Assignee: Open Law Library, Washington, DC (US)

(*) Notice: Subject to any disclaimer, the term of this patent is extended or adjusted under 35 U.S.C. 154(b) by 0 days.

(21) Appl. No.: 15/893,470

(22) Filed: Feb. 9, 2018

Related U.S. Application Data

(60) Provisional application No. 62/582,095, filed on Nov. 6, 2017.

(51) Int. Cl.
  *G06F 40/14* (2020.01)
  *G06F 40/151* (2020.01)
  (Continued)

(52) U.S. Cl.
  CPC ............ *G06F 40/14* (2020.01); *G06F 40/151* (2020.01); *G06F 40/169* (2020.01); *G06N 20/00* (2019.01)

(58) Field of Classification Search
  CPC ............ G06F 17/2247; G06F 17/2264; G06F 17/241; G06F 40/14; G06F 40/169; G06F 40/151; G06N 99/005; G06N 20/00
  See application file for complete search history.

(56) References Cited

U.S. PATENT DOCUMENTS

2003/0135520 A1* 7/2003 Mitchell ............... G06F 16/219
2006/0080599 A1* 4/2006 Dubinsky .............. G06Q 10/10
                                                            715/255
(Continued)

OTHER PUBLICATIONS

Palmirani, Monica et al. "Metadata for the Legal Domain" 2003 IEEE (Year: 2003).*

(Continued)

*Primary Examiner* — Stephen S Hong
*Assistant Examiner* — Nicholas Hasty
(74) *Attorney, Agent, or Firm* — Knobbe Martens Olson & Bear LLP

(57) ABSTRACT

An artificial intelligence-based legislative code validation and publication system is described herein. For example, the legislative code validation and publication system can be implemented within a user device, a network-accessible server, or a combination thereof. The legislative code validation and publication system can include a plug-in, add-on, extension, or other component that causes an enhanced text editor to support additional functionality. In particular, the plug-in causes the enhanced text editor to generate structure-based markup language code as text is entered, provide auto-complete features, and/or validate the generated structure-based markup language code according to a jurisdiction's style guide. The legislative code validation and publication system can then modify the markup language code to include codification annotations, thereby forming annotated markup language code. The legislative code validation and publication system can publish a transformed version of the annotated markup language code to cause a device to display an updated legislative code.

16 Claims, 20 Drawing Sheets

(51) Int. Cl.
*G06F 40/169* (2020.01)
*G06N 20/00* (2019.01)

(56) References Cited

U.S. PATENT DOCUMENTS

| | | | | |
|---|---|---|---|---|
| 2012/0173412 A1* | 7/2012 | Rosenstein | ........ | G06Q 50/184 |
| | | | | 705/39 |
| 2012/0226595 A1* | 9/2012 | Torres | .................. | G06Q 40/06 |
| | | | | 705/37 |
| 2014/0279201 A1* | 9/2014 | Iyoob | ................ | G06Q 30/0631 |
| | | | | 705/26.7 |
| 2015/0121202 A1* | 4/2015 | Saund | .................. | G06F 40/103 |
| | | | | 715/249 |
| 2015/0169677 A1* | 6/2015 | Noiman | ................ | G06Q 10/10 |
| | | | | 707/722 |

OTHER PUBLICATIONS

Otto, Paul N. et al. "Addressing Legal Requirements in Requirements Engineering", IEEE 2007 p. 5-14 (Year: 2007).*

* cited by examiner

```
...
<section codify:doc="D.C. Law 17-196">
  <num>1032</num>
  <text>The Captive Insurance Agency Establishment Act of 2008, effective July 18, 2008 (D.C. Law 17-196;
  D.C. Official Code § 1-307.81 <em>et seq.</em>), is amended as follows:</text>
  <para>
    <num>(a)</num>
    <text>Section 3 (D.C. Official Code § 1-307.82) is amended to read as follows:</text>
    <include>
      <para>
        <codify:replace path="§3|(b)|(2)"/>
        <num>(2)</num>
        <text>Provide insurance for District real property assets and District personal
        property assets.</text>
      </para>
    </include>
    <aftertext>.</aftertext>
  </para>
...
```

Fig. 5A

```
<section>
    <num>3033</num>
    <text>Section 6(h)(4)(C)(i) of the District of Columbia Funeral Services Regulatory Act of 1984, effective May
    22, 1984 (D.C. Law 5-84; D.C. Official Code § 3-405(h)(4)(C)(i)), is amended by striking the phrase "The
    Anatomical Board, human tissue banks, and anatomical gifts;" and inserting the phrase "Human tissue banks
    and anatomical gifts;" in its place</text>
    <codify:find-replace doc="D.C. Law 5-84" path="§6|(h)|(4)|(C)|(i)" count="1">
        <find>The Anatomical Board, human tissue banks, and anatomical gifts;</find>
        <replace>Human tissue banks and anatomical gifts;</replace>
    </codify:find-replace>
</section>
```

ARTIFICIAL INTELLIGENCE-BASED LEGISLATIVE CODE VALIDATION AND PUBLICATION SYSTEM

CROSS-REFERENCE TO RELATED APPLICATIONS

This application claims priority under 35 U.S.C. § 119(e) to U.S. Provisional Application No. 62/582,095, entitled "ARTIFICIAL INTELLIGENCE-BASED LEGISLATIVE CODE VALIDATION AND PUBLICATION SYSTEM" and filed on Nov. 6, 2017, which is hereby incorporated by reference herein in its entirety.

BACKGROUND

A markup language is a computer programming language used to electronically annotate machine-readable text. For example, the markup language may include instructions that, when parsed or executed, instruct a computing device how to display the machine-readable text. While the machine-readable text and the instructions may be included within a markup language file, the displayed content may not include the instructions. As an illustrative example, HyperText markup language (HTML) describes the structure and/or appearance of a content page (e.g., a network page, a web page, etc.) using tags. The tags represent the instructions and therefore may not be displayed by a computing device when the computing device renders the HTML for display.

As with any computer programming language, it can be difficult to draft code in a particular markup language if a user is otherwise unfamiliar with the markup language. For example, a user may have trouble drafting HTML code if the user is unfamiliar with the rules that govern proper HTML code syntax.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for processing a document using artificial intelligence. The system comprises a user device; and a computing system comprising one or more computing devices, where the computing system is configured with specific computer-executable instructions to: convert text of the document into markup language code, validate the markup language code, transmit a notification to the user device that includes results of the validation of the markup language code, and output the markup language code.

The system of the preceding paragraph can include any sub-combination of the following features: where the computing system is further configured with specific computer-executable instructions to: process a selection of an error included in the results, and generate user interface data that, when rendered by the user device, causes the user device to display a user interface in which a portion of the text of the document corresponding to the error is identified; where the computing system is further configured with specific computer-executable instructions to: process an indication that the text of the document is fully entered, and convert the text of the document into the markup language code in response to processing the indication that the text of the document is fully entered; where the computing system is further configured with specific computer-executable instructions to: convert the text into the markup language code as a user enters the text; and validate the markup language code as the user enters the text; where the computing system is further configured with specific computer-executable instructions to validate the markup language code using one or more rules corresponding to a style guide of a jurisdiction; where the computing system is further configured with specific computer-executable instructions to identify a citation in the markup language code using a machine learning model trained on a set of existing documents; where the computing system is further configured with specific computer-executable instructions to: obtain transformation annotations, and modify the markup language code based on the transformation annotations to form annotated markup language code, where the annotated markup language code comprises one or more transforms; and where the computing system is further configured with specific computer-executable instructions to: apply at least some of the one or more transforms to form transformed markup language code, publish the transformed markup language code, where the transformed markup language code represents an updated version of the legislative code, and transmit the published transformed markup language code to the user device for display.

Another aspect of the disclosure provides a computer-implemented method of processing a document using artificial intelligence. The computer-implemented method comprises: as implemented by one or more computing devices configured with specific computer-executable instructions, converting text of the document into markup language code; validating the markup language code; transmitting a notification to a user device that includes results of the validation of the markup language code; and outputting the markup language code.

The computer-implemented method of the preceding paragraph can include any sub-combination of the following features: where the computer-implemented method further comprises: receiving a selection of an error included in the results, and generating user interface data that, when rendered by the user device, causes the user device to display a user interface in which a portion of the text of the document corresponding to the error is identified; where converting text of the document into markup language code further comprises: receiving an indication that the text of the document is fully entered, and converting the text of the document into the markup language code in response to processing the indication that the text of the document is fully entered; where converting text of the document into markup language code further comprises: converting the text into the markup language code as a user enters the text, and validating the markup language code as the user enters the text; where validating the markup language code further comprises validating the markup language code using one or more rules corresponding to a style guide of a jurisdiction; where the computer-implemented method further comprises identifying a citation in the markup language code using a machine learning model trained on a set of existing documents; where the computer-implemented method further comprises obtaining transformation annotations, and modifying the markup language code based on the transformation annotations to form annotated markup language code, where the annotated markup language code comprises one or more transforms; and where the computer-implemented method further comprises applying at least some of the one or more transforms to form transformed markup language code, publishing the transformed markup language code, where the transformed markup language code represents an updated version of the legislative code, and transmitting the published transformed markup language code to the user device for display.

Another aspect of the disclosure provides non-transitory, computer-readable storage media comprising computer-executable instructions for processing a document using artificial intelligence, where the computer-executable instructions, when executed by a computer system, cause the computer system to: convert text of the document into markup language code; validate the markup language code; transmit a notification to a user device that includes results of the validation of the markup language code; and output the markup language code.

The non-transitory, computer-readable storage media of the preceding paragraph can include any sub-combination of the following features: where the computer-executable instructions further cause the computer system to: process a selection of an error included in the results, and generate user interface data that, when rendered by the user device, causes the user device to display a user interface in which a portion of the text of the document corresponding to the error is identified; where the computer-executable instructions further cause the computer system to: process an indication that the text of the document is fully entered, and convert the text of the document into the markup language code in response to processing the indication that the text of the document is fully entered; where the computer-executable instructions further cause the computer system to: convert the text into the markup language code as a user enters the text, and validate the markup language code as the user enters the text.

Another aspect of the disclosure provides a system for processing a document using artificial intelligence to insert annotations. The system comprises: a user device; and a computing system comprising one or more computing devices, where the computing system is configured with specific computer-executable instructions to: obtain one or more files that include markup language code, obtain transformation annotations, modify the markup language code based on the transformation annotations to form annotated markup language code, validate the annotated markup language code, and transmit a notification to the user device that includes results of the validation of the annotated markup language code.

The system of the preceding paragraph can include any sub-combination of the following features: where the computing system is further configured with specific computer-executable instructions to identify a citation in the markup language code using a machine learning model trained on a set of existing documents; where the computing system is further configured with specific computer-executable instructions to predict at least some of the transformation annotations using a machine learning model trained using a training set of second markup language code and corresponding transformation annotations; where the computing system is further configured with specific computer-executable instructions to predict at least some of the transformation annotations using a machine learning model trained using a set of data that includes a mapping between approved laws and portions of legislative code; where the computing system is further configured with specific computer-executable instructions to validate the annotated markup language code in response to processing an indication that the transformation annotations are fully entered; where the computing system is further configured with specific computer-executable instructions to validate the annotated markup language code as the transformation annotations are obtained; where the markup language code comprises extensible markup language (XML) code.

Another aspect of the disclosure provides a computer-implemented method of processing a document using artificial intelligence to insert annotations. The computer-implemented method comprises: as implemented by one or more computing devices configured with specific computer-executable instructions, obtaining one or more files that include markup language code; obtaining transformation annotations; modifying the markup language code based on the transformation annotations to form annotated markup language code; validating the annotated markup language code; and transmitting a notification to a user device that includes results of the validation of the annotated markup language code.

The computer-implemented method of the preceding paragraph can include any sub-combination of the following features: where the computer-implemented method further comprises identifying a citation in the markup language code using a machine learning model trained on a set of existing documents; where the computer-implemented method further comprises predicting at least some of the transformation annotations using a machine learning model trained using a training set of second markup language code and corresponding transformation annotations; where the computer-implemented method further comprises predicting at least some of the transformation annotations using a machine learning model trained using a set of data that includes a mapping between approved laws and portions of legislative code; where validating the annotated markup language code further comprises validating the annotated markup language code in response to processing an indication that the transformation annotations are fully entered; and where validating the annotated markup language code further comprises validating the annotated markup language code as the transformation annotations are obtained.

Another aspect of the disclosure provides non-transitory, computer-readable storage media comprising computer-executable instructions for processing a document using artificial intelligence to insert annotations, where the computer-executable instructions, when executed by a computer system, cause the computer system to: obtain one or more files that include markup language code; obtain transformation annotations; modify the markup language code based on the transformation annotations to form annotated markup language code; validate the annotated markup language code; and transmit a notification to a user device that includes results of the validation of the annotated markup language code.

The non-transitory, computer-readable storage media of the preceding paragraph can include any sub-combination of the following features: where the computer-executable instructions further cause the computer system to identify a citation in the markup language code using a machine learning model trained on a set of existing documents; where the computer-executable instructions further cause the computer system to predict at least some of the transformation annotations using a machine learning model trained using a training set of second markup language code and corresponding transformation annotations; where the computer-executable instructions further cause the computer system to predict at least some of the transformation annotations using a machine learning model trained using a set of data that includes a mapping between approved laws and portions of legislative code; where the computer-executable instructions further cause the computer system to validate the annotated markup language code in response to processing an indication that the transformation annotations are fully entered; where the computer-executable instructions further cause the computer system to validate the annotated markup language code as the transformation annotations are obtained; and where the markup language code comprises extensible markup language (XML) code.

Another aspect of the disclosure provides a system for processing transformations using artificial intelligence to generate a document. The system comprises: a user device; and a computing system comprising one or more computing devices, where the computing system is configured with specific computer-executable instructions to: obtain one or more files that include markup language code, obtain transformation annotations, modify the markup language code based on the transformation annotations to form annotated markup language code, where the annotated markup language code comprises one or more transforms, and apply at least some of the one or more transforms to form transformed markup language code.

The system of the preceding paragraph can include any sub-combination of the following features: where the computing system is further configured with specific computer-executable instructions to publish the transformed markup language code; where the transformed markup language code represents an updated version of legislative code; where the computing system is further configured with specific computer-executable instructions to transmit the published transformed markup language code to the user device for display; where the computing system is further configured with specific computer-executable instructions to: receive, from the user device, an effective date and a user perspective date, identify a first set of the one or more transforms that are effective as of the effective date and that correspond to a law approved prior to or on the user perspective date, and apply the first set of the one or more transforms to form the transformed markup language code; where the computing system is further configured with specific computer-executable instructions to apply the one or more transforms and other transforms stored in a data store to form the transformed markup language code; where the computing system is further configured with specific computer-executable instructions to iterate through each approved law that modifies the document, from most recent approved law to least recent approved law, and apply, to the respective approved law, transforms of approved laws that are more recent than the respective approved law in order from least recent approved law to most recent approved law; and where the one or more transforms are each co-located with text describing the respective transform.

Another aspect of the disclosure provides a computer-implemented method of processing transformations using artificial intelligence to generate a document. The computer-implemented method comprises: as implemented by one or more computing devices configured with specific computer-executable instructions, obtain annotated markup language code, where markup language code is modified based on transformation annotations to form the annotated markup language code, and where the annotated markup language code comprises one or more transforms; and applying at least some of the one or more transforms to form transformed markup language code.

The computer-implemented method of the preceding paragraph can include any sub-combination of the following features: where the computer-implemented method further comprises publishing the transformed markup language code; where the transformed markup language code represents an updated version of legislative code; where the computer-implemented method further comprises transmitting the published transformed markup language code to a user device for display; where applying at least some of the one or more transforms further comprises: receiving, from a user device, an effective date and a user perspective date, identifying a first set of the one or more transforms that are effective as of the effective date and that correspond to a law approved prior to or on the user perspective date, and applying the first set of the one or more transforms to form the transformed markup language code; where applying at least some of the one or more transforms further comprises applying the one or more transforms and other transforms stored in a data store to form the transformed markup language code; where applying at least some of the one or more transforms further comprises iterating through each approved law that modifies the document, from most recent approved law to least recent approved law, and applying, to the respective approved law, transforms of approved laws that are more recent than the respective approved law in order from least recent approved law to most recent approved law; and where the one or more transforms are each co-located with text describing the respective transform.

Another aspect of the disclosure provides non-transitory, computer-readable storage media comprising computer-executable instructions for processing transformations using artificial intelligence to generate a document, where the computer-executable instructions, when executed by a computer system, cause the computer system to: obtain annotated markup language code, where markup language code is modified based on transformation annotations to form the annotated markup language code, and where the annotated markup language code comprises one or more transforms; and apply at least some of the one or more transforms to form transformed markup language code.

The non-transitory, computer-readable storage media of the preceding paragraph can include any sub-combination of the following features: where the computer-executable instructions further cause the computer system to publish the transformed markup language code; where the transformed markup language code represents an updated version of legislative code; where the computer-executable instructions further cause the computer system to transmit the published transformed markup language code to ae user device for display; where the computer-executable instructions further cause the computer system to: receive, from a user device, an effective date and a user perspective date, identify a first set of the one or more transforms that are effective as of the effective date and that correspond to a law approved prior to or on the user perspective date, and apply the first set of the one or more transforms to form the transformed markup language code; and where the one or more transforms are each co-located with text describing the respective transform.

Another aspect of the disclosure provides a system for publishing legislative code using artificial intelligence. The system comprises: a user device; and a computing system comprising one or more computing devices, where the computing system is configured with specific computer-executable instructions to: convert text into markup language code as a user enters text, validate the markup language code in response to an indication that the entering of text is complete, obtain transformation annotations, modify the markup language code based on the transformation annotations to form annotated markup language code, where the annotated markup language code comprises one or more transforms, apply at least some of the one or more transforms to form transformed markup language code, publish the transformed markup language code, where the transformed markup language code represents an updated version of the legislative code, and transmit the published transformed markup language code to the user device for display.

The system of the preceding paragraph can include any sub-combination of the following features: where the computing system is further configured with specific computer-executable instructions to auto-complete at least a portion of the text entered by the user using a machine learning model trained using at least one of a training set of properly formatted citations to at least one of laws or legislative codes or a training set of at least one of existing laws or legislative codes; where the computing system is further configured with specific computer-executable instructions to predict at least some of the transformation annotations using a machine learning model trained using a training set of second markup language code and corresponding transformation annotations; where the computing system is further configured with specific computer-executable instructions to: receive, from the user device, an effective date and a user perspective date, identify a first set of the one or more transforms that are effective as of the effective date and that correspond to a law approved prior to or on the user perspective date, and apply the first set of the one or more transforms to form the transformed markup language code; where the computing system is further configured with specific computer-executable instructions to apply the one or more transforms and other transforms stored in a data store to form the transformed markup language code; where the computing system is further configured with specific computer-executable instructions to iterate through each approved law that modifies the legislative code, from most recent approved law to least recent approved law, and apply, to the respective approved law, transforms of approved laws that are more recent than the respective approved law in order from least recent approved law to most recent approved law; where the computing system is further configured with specific computer-executable instructions to validate the markup language code using one or more rules corresponding to a style guide of a jurisdiction; where the markup language code comprises structural annotations; and where the markup language code comprises extensible markup language (XML) code.

Another aspect of the disclosure provides a computer-implemented method of publishing legislative code using artificial intelligence. The computer-implemented method comprises: as implemented by one or more computing devices configured with specific computer-executable instructions, converting text into markup language code as text is entered in an application executing on one of the one or more computing devices or a user device; validating the markup language code in response to a user input; obtaining transformation annotations; modifying the markup language code based on the transformation annotations to form annotated markup language code, where the annotated markup language code comprises one or more transforms; applying at least some of the one or more transforms to form transformed markup language code; and publishing the transformed markup language code for display, where the transformed markup language code represents an updated version of the legislative code.

The computer-implemented method of the preceding paragraph can include any sub-combination of the following features: where the computer-implemented method further comprises auto-completing at least a portion of the entered text using a machine learning model trained using at least one of a training set of properly formatted citations to at least one of laws or legislative codes or a training set of at least one of existing laws or legislative codes; where the computer-implemented method further comprises predicting at least some of the transformation annotations using a machine learning model trained using a training set of second markup language code and corresponding transformation annotations; where applying at least some of the one or more transforms further comprises: receiving an effective date and a user perspective date, identifying a first set of the one or more transforms that are effective as of the effective date and that correspond to a law approved prior to or on the user perspective date, and applying the first set of the one or more transforms to form the transformed markup language code; where applying at least some of the one or more transforms further comprises applying the one or more transforms and other transforms stored in a data store to form the transformed markup language code; where applying at least some of the one or more transforms further comprises iterating through each approved law that modifies the legislative code, from most recent approved law to least recent approved law, and applying, to the respective approved law, transforms of approved laws that are more recent than the respective approved law in order from least recent approved law to most recent approved law; where validating the markup language code further comprises to validating the markup language code using one or more rules corresponding to a style guide of a jurisdiction; and where the markup language code comprises extensible markup language (XML) code.

Another aspect of the disclosure provides non-transitory, computer-readable storage media comprising computer-executable instructions for publishing legislative code, where the computer-executable instructions, when executed by a computer system, cause the computer system to: convert entered text into markup language code; validate the markup language code; modify the markup language code based on obtained transformation annotations to form annotated markup language code, where the annotated markup language code comprises one or more transforms; apply at least some of the one or more transforms to form transformed markup language code; and publish the transformed markup language code for display, where the transformed markup language code represents an updated version of the legislative code.

The non-transitory, computer-readable storage media of the preceding paragraph can include any sub-combination of the following features: where the computer-executable instructions further cause the computer system to auto-complete at least a portion of the entered text using a machine learning model trained using at least one of a training set of properly formatted citations to at least one of laws or legislative codes, or a training set of at least one of existing laws or legislative codes; and where the computer-executable instructions further cause the computer system to predict at least some of the transformation annotations using a machine learning model trained using a training set of second markup language code and corresponding transformation annotations.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 5A-5I illustrate a user interface displaying example structural and codification annotations.

DETAILED DESCRIPTION OF SPECIFIC EMBODIMENTS

Figure 1:
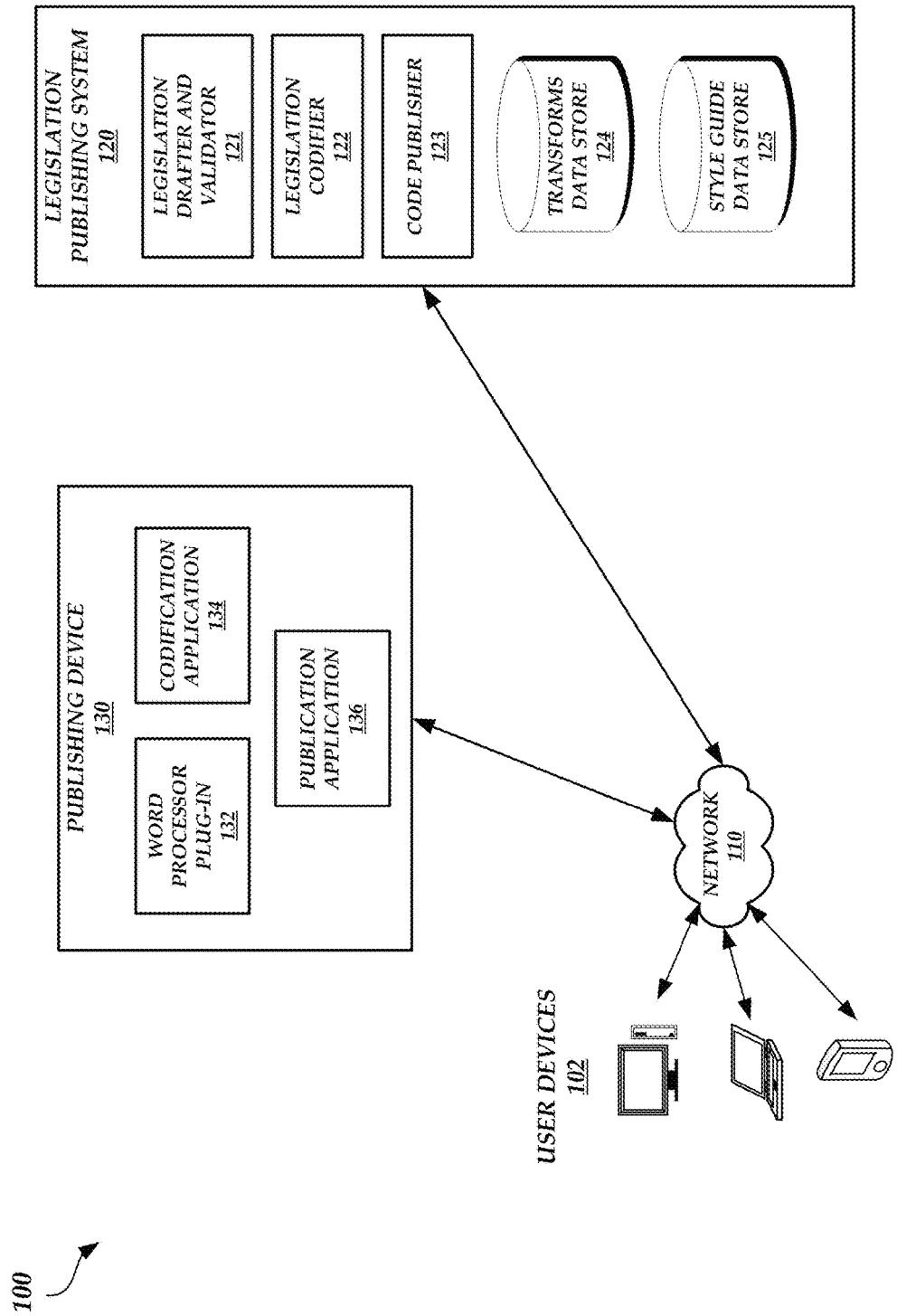
FIG. 1 is a block diagram of an illustrative operating environment in which a legislative publishing system and/or a publishing device implement techniques to generate markup language code, modify the markup language code such that an approved law can be used to modify an existing legislative code or generate a version of the legislative code, and publish a version of the legislative code.

As described above, it can be difficult for some users unfamiliar with the syntactic rules of a markup language (e.g., HTML, extensible markup language (XML), TeX, etc.) to draft code in such language. Even if a user is familiar with the syntactic rules of the markup language, it may be time consuming and inefficient for the user to draft the content and instructions in a manner that conforms with the syntactic rules. Thus, a word processor or other text editor that automatically converts formatted plain text into markup language code may be beneficial.

As an example, a text editor that automatically converts formatted plain text into markup language code may be especially beneficial in the context of drafting legislation. Increasingly, jurisdictions and/or third party entities are providing access to the legislative code of such jurisdictions electronically via a network (e.g., the Internet). In some cases, the legislative code is made available as a text document (e.g., a word processor document, a portable document format (PDF), etc.). In other cases, the legislative code is made available via a content page rendered using a markup language (e.g., HTML). The legislative code may initially be stored in one or more text documents. As laws are passed, a user may modify one or more of the text documents accordingly. To provide access to the modified legislative code via a content page rendered using a markup language, a user may use a text editor to convert one or more of the text documents into markup language code. A browser application running on a user device can then access and render the markup language code to display the modified legislative code.

Conventional text editors used to generate the markup language code, however, have several technical deficiencies in the context of drafting legislation. For example, a statute or code is a codified statement of some law that has been approved by a jurisdiction's legislative body. A jurisdiction may have a style guide to maintain consistency throughout various titles, sections, subsections, etc. of the code. As used herein, a jurisdiction can refer to a geographic region or an entity within a jurisdiction (e.g., a legislative council), a department within the executive branch, an independent agency, and/or the like. As an illustrative example, the style guide may indicate proper punctuation, when to use italics, when capitalization is appropriate, the proper format of citations, appropriate abbreviations, the proper use of numbered and/or bulleted lists, the proper format of dates, and/or other style rules that affect the format and/or appearance of the code's text. Conventional text editors do not provide any mechanism for validating that the content in a text document conforms to the style guide and/or that the resulting markup language code conforms to the style guide. As another illustrative example, a traditional word processor that may output markup only outputs markup that describes how to display a document (e.g., a display markup language, such as HTML or the MICROSOFT WORD file type DOCX). However, a law is a document with a semantic structure that can be directly described through a semantic markup language (e.g., XML). A style sheet can then be applied to the semantic markup to obtain an internally consistent display document.

As another example, a law that has been approved recites changes to be made to the code. The law, however, is not a document that serves as a replacement or substitute for a portion of the code. Rather, a user has to modify the code according to the changes recited in the law. A conventional text editor may provide the functionality to convert a text document that recites the legislative code into markup language code, but the conventional text editor does not provide the functionality to identify changes to the legislative code recited in the approved law and apply these changes accordingly prior to the conversion into the markup language code.

As another example, laws often refer to other portions of the same or different laws. However, the legislative code often refers to other portions of the legislative code. Conventional text editors provide no functionality to identify a citation in an approved law, determine a citation to the corresponding title or section in the legislative code, and replace the identified citation accordingly.

Current network-based systems that provide access to the legislative code also suffer from technical deficiencies. For example, a current network-based system may implement a version control system in which each new version of the legislative code is stored. In other words, when the legislative code is modified based on an approved law(s), the modified legislative code is stored as a new version by the network-based system. The current network-based system therefore does not store the changes recited in the approved law(s) that caused modification of the legislative code. As described in greater detail below, by storing updated versions of the legislative code rather than the changes recited in the approved laws, current network-based systems lack the ability to modify the legislative code in response to laws approved in the future without implementing natural language processing techniques to understand the content of the legislative code and/or the approved laws. Current network-based systems further lack the ability to display "blackline" comparisons between versions of legislative code at any temporal granularity less than the legislative code version, such as the law or even part of a law. For example, if a first law modifies the legislative code, but the first law is not incorporated into the legislative code until a second law that modifies the legislative code is also passed, such systems lack the ability to display a comparison between a current version of the legislative code and a version of the legislative code that would have incorporated the first law and not the second law.

Accordingly, disclosed herein is an artificial intelligence-based legislative code validation and publication system that overcomes the deficiencies described above. For example, the legislative code validation and publication system can be implemented within a user device, a network-accessible server, or a combination thereof. The legislative code validation and publication system can include a plug-in, add-on, extension, or other component that causes an enhanced text editor to support additional functionality. In particular, the plug-in causes the enhanced text editor to generate structure-based markup language code (e.g., XML code) as text is entered, provide auto-complete features, and/or validate the generated structure-based markup language code according to a jurisdiction's style guide.

The enhanced text editor (e.g., the plug-in) may generate the structure-based markup language code using a parser, heuristics, and/or machine learning model(s) that analyze text as text is entered by a user. For example, the plug-in may analyze the format of the entered text (e.g., the manner in which text is indented, styled, etc.) using heuristics to determine whether entered text resembles a specific structure (e.g., section, subsection, paragraph, etc.) of a law. Based upon the determination, the plug-in can generate markup language code by annotating the entered text with instructions indicating that the entered text is associated with a specific structure (e.g., via a tag associated with the identified structure). Alternatively or in addition, the plug-in may use a jurisdiction's style guide to determine whether entered text resembles a specific structure of a law. For example, the style guide of a jurisdiction may include one or more rules that define the format of a specific structure within a law (e.g., the format of sections, subsections, paragraphs, etc.). The plug-in can compare one or more of the rules with the format of entered text to determine whether the entered text matches the format of a specific structure. If the plug-in identifies a match, the plug-in can then generate markup language code by annotating the entered text with instructions indicating that the entered text is associated with the determined structure (e.g., via a tag associated with the determined structure). However, if the plug-in cannot identify a structure that corresponds with the entered text, then the plug-in may cause the enhanced text editor to display an error and/or a suggestion for correcting the error. The plug-in can repeat this process as additional text is entered.

The generated markup language code may be considered structure-based markup language code because the instructions (e.g., tags) included in the markup language code may indicate a structure of the text rather than a styling of the text. By generating structure-based markup language code, the enhanced text editor or another application can identify and directly link to a specific portion of a legislative code. Style-based markup language code does not allow such functionality unless natural language processing techniques or similar techniques are used by the application to identify possible sections, subsections, paragraphs, etc. Even if natural language processing techniques are used to identify possible sections, subsections, paragraphs, etc., such identification is associated with a confidence level that is often less than 100%. However, the structure-based markup language code allows the application to identify and link to a portion of the legislative code with greater certainty without the use of natural language processing techniques.

As the user enters text, the enhanced text editor can provide auto-complete functionality using one or more rules of the style guide and/or a stored list of laws and/or legislative codes. For example, the plug-in can identify entered characters and compare the entered characters to one or more rules of the style guide. If the entered characters violate a rule, the plug-in determines that the user is not attempting to add characters that conform to the violated rule. On the other hand, if the entered characters are consistent with a rule, the plug-in determines that the user may be attempting to add characters that conform to the unviolated rule. The plug-in can compare the entered characters to some or all of the rules. In response to the comparison(s), the plug-in can generate a list of one or more characters that the user may be attempting to enter. The characters included in the list may be characters that, if added to the entered characters, would result in the combined characters conforming to one or more rules. The enhanced text editor can display the list and the user may be able to select an item in the list. Selection of an item may cause the enhanced text editor to add the selected characters to the already entered characters. Thus, the enhanced text editor may allow the user to add text to the text document without requiring the user to enter all of the characters comprised within the text.

As another example, the plug-in can identify entered characters and compare the entered characters to one or more rules of the style guide and one or more laws and/or legislative codes included in the stored list of laws and/or legislative codes. In particular, the plug-in can compare the entered characters to one or more rules corresponding to the proper format for referencing or citing other laws and/or legislative codes (referred to herein as "citation rules"). If the plug-in determines based on the comparison that the entered characters are consistent with one or more citation rules, then the plug-in may compare the entered characters with the characters representing the names of one or more laws and/or legislative codes stored in the list to identify which laws and/or legislative codes the user may be attempting to reference. For example, the plug-in may identify laws and/or legislative codes that are represented by characters that at least partially match the entered characters (e.g., identify laws and/or legislative codes in which the entered characters are at least some of the characters that represent the laws and/or legislative codes). Using the identified laws and/or legislative codes and the citation rules, the plug-in can generate a list of one or more characters that the user may be attempting to enter. The characters included in the list may be characters that, if added to the entered characters, would result in the combined characters forming a reference or citation to one of the identified laws and/or legislative codes. The enhanced text editor can display the list and the user may be able to select an item in the list. Selection of an item may cause the enhanced text editor to add the selected characters to the already entered characters. Thus, the enhanced text editor may allow the user to add a complete citation to the text document without requiring the user to enter all of the characters necessary to form a complete citation.

Alternatively or in addition, the enhanced text editor may use artificial intelligence processes (e.g., machine learning processes) to provide the auto-complete functionality. For example, the enhanced text editor may use a trained citation machine learning model, a search engine query, and/or n-gram or word buckets to determine one or more sets of one or more characters that would form a complete, properly formatted citation to an existing law and/or legislative code based on a set of characters provided as an input (e.g., the characters entered by the user in the enhanced text editor). Thus, the computing device running the enhanced text editor may use artificial intelligence to predict user inputs and thereby improve the functionality of the computing device itself.

Once the user has entered some or all of the text, the enhanced text editor can validate the generated markup language code. For example, the plug-in can use one or more rules of the style guide to determine whether the structure of the generated markup language code conforms to the jurisdiction's style guide. The plug-in can parse through the generated markup language code to identify structural annotations (e.g., instructions or tags that indicate a structure of the text). The plug-in can then compare one or more structural annotations and the corresponding text with one or more rules to identify whether the structural annotations and corresponding text conform with the style guide. If an error is detected (e.g., a structural annotation and/or corresponding text does not conform to a rule), then the enhanced text editor can display an error and/or display a suggested change to resolve the error. The enhanced text editor may provide the ability for a user to accept a suggested change, to provide a different change, or to ignore an error.

After any errors have been resolved (and/or ignored), the enhanced text editor may provide an option to store, open, and/or export the generated markup language code. In an alternate embodiment, the enhanced text editor exports the generated markup language code despite errors. In this embodiment, the generated markup language code may be incomplete or include errors. Generally, the generated markup language code is a structural, markup language representation of an approved law. Thus, the generated markup language code includes text reciting how to modify a legislative code. In order for a computing device to modify automatically the legislative code without using natural language processing techniques to understand the content of the approved law, the generated markup language code can be modified to include codification annotations (e.g., tags) that provide instructions in the markup language code identifying how a portion of the law affects a portion of the legislative code. The codification annotations may also be referred to herein as "transformation annotations." For example, the enhanced text editor, a separate application in the legislative code validation and publication system, such as a codification application, or a combination thereof can modify the generated markup language code. As an example, a user can view the generated markup language code in the codification application and use the codification application to insert codification annotations in the markup language code. The types of codification annotations are described in greater detail below.

In an embodiment, the codification application can assist the user in identifying portions of the markup language code in which codification annotations should be inserted. For example, the codification application can use a machine learning process to identify citations to laws included in the generated markup language code that should be annotated to reference the corresponding portion of the legislative code.

Optionally, the citation machine learning model described above can be repurposed to identify possible citations by providing one or more characters included in the generated markup language code as an input to the citation machine learning model. Once the codification application identifies a citation, the codification application may highlight the citation. A user may then quickly identify a citation, select a button or provide a key command to select the citation, and insert a codification annotation that references a portion of the legislative code corresponding to the approved law referenced by the citation.

Similarly, the codification application can use a machine learning process to predict codification annotations to insert into the markup language code. For example, the computing device running the codification application or another computing device can train an annotation prediction machine learning model using a training set of markup language code and corresponding codification annotations. The codification application can parse the markup language code, using portions of the markup language code as an input to the annotation prediction machine learning model to cause the annotation prediction machine learning model to output possible codification annotation(s) corresponding to the provided input. As another example, the codification application can use a machine learning process to identify a legislative code to which a law citation corresponds once the law citation is detected. The codification application may predict the corresponding legislative code based on a legislation machine learning model trained (e.g., by a computer device that may or may not be running the codification application) using a training set of data that includes a mapping between approved laws and portions of the legislative code.

After the codification application modifies the markup language code with the codification annotations, the annotated markup language code may have the content necessary to allow a computing device to update and publish at least a portion of the corresponding legislative code. For example, the enhanced text editor, the codification application, a separate application in the legislative code validation and publication system, such as a publication application, or a combination thereof can update and publish the legislative code.

The codification annotations and/or any corresponding text may be referred to herein as "transforms." Because of the properties of the structural and codification annotations, the publication application (or any other application that updates and publishes the legislative code) does not need to execute natural language processing techniques to understand the content of the approved law in order to determine how the legislative code should be updated. Rather, the publication application can merely apply the current transforms and any past transforms (e.g., transforms generated when processing a previous law) in order to update the legislative code. Application of the transforms may cause the publication application to generate transformed markup language code. The process for applying transforms is described in greater detail below.

The publication application can then publish the transformed markup language code. For example, the publication application can convert the transformed markup language code into a text document, a PDF, an electronic message, and/or the like that presents the updated legislative code. Alternatively or in addition, the publication application can provide access to the transformed markup language code such that a user device, upon rendering the transformed markup language code using a browser application, displays the updated legislative code in a user interface.

As described herein, the legislative code validation and publication system stores the transforms rather than the updated legislative code, which differs from conventional version control systems in network-based systems that provide access to legislative code. When an updated legislative code is requested, the legislative code validation and publication system may apply the appropriate transforms to generate a transformed markup language code that represents the state of the legislative code on a selected date. Because of the manner in which laws are drafted, laws often do not state what specific changes are to be made to the legislative code. Rather, the laws provide general statements indicating how the law intends to modify the legislative code. As an illustrative example, a third law may recite that a second law is to be repealed. The second law, however, may have amended a first law. Thus, repealing the second law means reverting the text of the legislative code to the text present in the first law. While the third law recites that the second law is to be repealed, the third law does not explicitly recite the language in the legislative code that is to be replaced or to what that language should be changed (e.g., the third law does not identify what language in the first law should replace the current language in the legislative code). Conventional version control systems that store different versions of the legislative code have no mechanism for identifying the language in the legislative code that is to be replaced or to what that language should be changed because any data used to update the legislative code is discarded and a stored version of the legislative code is not associated with any information that might indicate what law(s) changed the legislative code to the stored version, what portion of the legislative code was changed, and/or from what was the portion of the legislative code changed. Accordingly, such convention systems cannot identify the language in the legislative code that is to be replaced or to what that language should be changed without either applying natural language processing techniques to understand the content and/or relationship between different laws and/or portions of the legislative code or relying on legal research performed by a human.

However, the legislative code validation and publication system described herein does not have to rely on natural language processing techniques or human research. If the legislative code validation and publication system applies the transforms in a specific order, as described in greater detail below, the characteristics of the transforms are such that the legislative code validation and publication system can ignore the content or relationship between different laws and/or portions of the legislative code. The legislative code validation and publication system can simply execute the same process, regardless of the content of the approved law or legislative code, to apply the transforms and generate the updated legislative code. As compared with conventional systems, the legislative code validation and publication system can therefore spend fewer computing resources (e.g., because the legislative code validation and publication system can execute fewer computer-executable instructions given that natural language processing instructions are not necessary, because the legislative code validation and publication system can execute the same process for any update to the legislative code, etc.), provide faster results (e.g., because the legislative code validation and publication system does not have to determine the content or relationship between laws and/or portions of the legislative code, because the legislative code validation and publication system can execute the same process for any update to the legislative code, etc.), and provide more accurate results (e.g., because the legislative code validation and publication system does not have to rely on natural language processing techniques or human research, which can be less than 100% accurate, in identifying what portions of the legislative code to change) in generating the updated legislative code.

In addition, the legislative code validation and publication system described herein improves the functionality of the computing device(s) that implements some or all of the functionality of the legislative code validation and publication system described herein. For example, the legislative code validation and publication system can use machine learning to provide auto-complete functionality, to identify citations to laws included in the generated markup language code that should be annotated to reference the corresponding portion of the legislative code, to predict codification annotations to insert into the markup language code, and/or the like. Machine learning is a subset of artificial intelligence that iteratively learns from data without being explicitly programmed. Thus, a computing device configured to use a machine learning process to perform an action can learn how to perform the action without being explicitly programmed. Accordingly, the machine learning process improves the functionality of the computing device itself because the machine learning process allows the computing device to learn, and thereby produce more accurate auto-completes, citation identifications, codification annotations, etc., without being explicitly programmed.

In general, a human does not use a machine learning process to perform any actions given that machine learning is a subset of artificial intelligence and humans use human or natural intelligence to perform actions, not artificial intelligence. It would be impractical for a human (or even a group of humans) to, for example, identify citations that should be annotated or predict codification annotations to insert using a machine learning process without the use of a computer. For example, due to the fact that machine learning involves the iterative learning from data, a computing device that uses a machine learning process to perform an action is not programmed by a human with explicit instructions that cause the action to be performed. Rather, a computing device that uses a machine learning process to perform an action makes decisions or predictions in the course of performing the action based on a model learned or trained using sample data. Thus, there is not a known set of instructions that a human could simply follow to mimic the actions performed using a machine learning process.

While the legislative code validation and publication system is described herein as processing laws and/or codes, this is not meant to be limiting. For example, the legislative code validation and publication system described herein can process any legal document that is a compilation of other legal documents and/or is amended by other legal documents, such as contracts, regulations, codes of regulation, laws, rules, memoranda of agreement, and/or the like. The legislative code validation and publication system can process such a legal document to generate amended or revised legal documents.

The foregoing aspects and many of the attendant advantages of this disclosure will become more readily appreciated as the same become better understood by reference to the following detailed description, when taken in conjunction with the accompanying drawings.

Example Legislative Code Validation and Publication Environment

FIG. 1 is a block diagram of an illustrative operating environment 100 in which a legislative publishing system 120 and/or a publishing device 130 implement techniques to generate markup language code, modify the markup language code such that an approved law can be used to modify an existing legislative code or generate a version of the legislative code, and publish a version of the legislative code. The operating environment 100 further includes various user devices 102 that may communicate with the legislative publishing system 120 via a network 110 to request a current or updated version of the legislative code.

The publishing device 130 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The publishing device 130 may execute a text editor (e.g., a word processing application) that is modified with a word processor plug-in 132. The publishing device 130 may further execute a codification application 134 and a publication application 136. While the publishing device 130 is described herein as executing separate applications, this is not meant to be limiting. For example, the functionality described herein with respect to the word processor plug-in 132, the codification application 134, and/or the publication application 136 may be implemented in one or more applications.

The word processor plug-in 132 may be a plug-in, add-on, extension, or other component that causes the text editor to support additional functionality, where the combination of the text editor and the word processor plug-in 132 may be referred to herein as an "enhanced text editor." In particular, the word processor plug-in 132 causes the enhanced text editor to generate structure-based markup language code (e.g., XML code) as text is entered, provide auto-complete features, and/or validate the generated structure-based markup language code according to a jurisdiction's style guide.

The word processor plug-in 132 may include a parser, a text-to-code converter, and/or other components to implement the functionality described herein. The word processor plug-in 132 receives application programming interface (API) calls from the text editor when the user moves a cursor, when a change is made to a text document open in the text editor, and/or the like. As the word processor plug-in 132 receives API calls indicating that the cursor has moved and/or that the text document has been modified, the word processor plug-in 132 may generate the structure-based markup language code using the parser and/or heuristics that analyze at least a portion of the text in the text document. For example, the word processor plug-in 132 may analyze the format of the entered text (e.g., the manner in which text is indented, styled, etc.) using heuristics to determine whether entered text resembles a specific structure (e.g., section, subsection, paragraph, etc.) of a law. Based upon the determination, the word processor plug-in 132 can generate markup language code by annotating the entered text with instructions indicating that the entered text is associated with a specific structure (e.g., by bracketing the entered text with a tag associated with the identified structure). Example instructions can include "section," "num," "text," "paragraph," etc. These instructions are described in greater detail below with respect to FIGS. 5A-5I.

Alternatively or in addition, the word processor plug-in 132 may use a jurisdiction's style guide to determine whether entered text resembles a specific structure of a law. For example, the style guide of a jurisdiction may include one or more rules that define the format of specific structure within a law (e.g., the format of sections, subsections, paragraphs, etc.). The publishing device 130 may store rules for one or more style guides locally in memory. Within the enhanced text editor, the user may select a certain jurisdiction and/or style guide (e.g., a style guide corresponding to a municipality for which the user is drafting legislation). The word processor plug-in 132 can then retrieve the rules corresponding to the selected jurisdiction and/or style guide from the memory. When a style guide is updated, the publishing device 130 may receive one or more updated rules from an external source via the network 110. Alternatively or in addition, the rules for a style guide may be stored in style guide data store 125 of the legislation publishing system 120. When a jurisdiction and/or style guide is selected in the enhanced text editor, the publishing device 130 may transmit a request to the legislation publishing system 120 for the rules that correspond with the selected jurisdiction and/or style guide. The legislation publishing system 120 may use the jurisdiction and/or style guide identified in the request to retrieve the appropriate rules from the style guide data store 125 and forward such rules to the publishing device 130.

The word processor plug-in 132 can compare one or more of the rules with the format of entered text to determine whether the entered text matches the format of a specific structure. If the word processor plug-in 132 identifies a match, the word processor plug-in 132 can then generate markup language code by annotating the entered text with instructions indicating that the entered text is associated with the determined structure (e.g., by bracketing the entered text with a tag associated with the determined structure). However, if the word processor plug-in 132 cannot identify a structure that corresponds with the entered text, then the word processor plug-in 132 may cause the enhanced text editor to display an error and/or a suggestion for correcting the error. As an illustrative example, the style guide may dictate that a section should be bolded. If the word processor plug-in 132 analyzes text that is not bolded and otherwise does not conform to the format of another structure in the law, the word processor plug-in 132 may cause the enhanced text editor to display an error indicating that the entered text should be bolded. The word processor plug-in 132 may allow the enhanced text editor to provide a user with the ability to accept a suggested change, to provide a different change, or to ignore an error. The word processor plug-in 132 can repeat this process as additional text is entered.

The generated markup language code may be considered structure-based markup language code because the instructions (e.g., tags) included in the markup language code may indicate a structure of the text rather than a styling of the text. In other words, the generated markup language code may be considered structure-based markup language code because the markup language code is a machine-readable representation of a document that encodes the semantic structure (as opposed to the display structure) of the document, such as references to the document and other documents, dates, names, institutions, and/or the like. As an illustrative example, instructions that indicate a structure of the text may include instructions that identify the presence of a section (e.g., a "section" tag), that the section is labeled with a certain alphanumeric value (e.g., a "num" tag), that the section includes text with a certain number of paragraphs (e.g., a "text" and/or "para" tag), and/or the like. Such structural instructions may also be referred to herein as "structural annotations." On the other hand, instructions that indicate a styling of the text may include instructions that identify the presence of a new paragraph and that the text in the new paragraph has a certain font type, font size, bolding, underlining, italicization, etc. By generating structure-based markup language code, the enhanced text editor or another application (e.g., the codification application 134, the publication application 136, etc.) can identify and directly link to a specific portion of a legislative code. Style-based markup language code does not allow such functionality unless natural language processing techniques or similar techniques are used by the application to identify possible sections, subsections, paragraphs, etc. Even if natural language processing techniques are used to identify possible sections, subsections, paragraphs, etc., such identification is associated with a confidence level that is often less than 100%. However, the structure-based markup language code allows an application to identify and link to a portion of the legislative code with 100% certainty without the use of natural language processing techniques.

As the user enters text (e.g., as the word processor plug-in 132 receives API calls from the text editor), the word processor plug-in 132 can provide auto-complete functionality using one or more rules of the style guide and/or a stored list of laws and/or legislative codes. For example, the publishing device 130 can store a list of laws and/or legislative codes for various jurisdictions locally in memory. As another example, the legislation publishing system 120 may store a list of laws and/or legislative codes for various jurisdictions in a data store (not shown). Thus, the publishing device 120 may be able to retrieve the list of laws and/or legislative codes from local memory or from the legislation publishing system 120 using a jurisdiction selected by the user. The word processor plug-in 132 can identify entered characters and compare the entered characters to one or more rules of the style guide. If the entered characters violate a rule (e.g., the entered characters "(1" violate a section rule because the section rule indicates that sections start with one or more letters in parentheses, such as "(a)"), the word processor plug-in 132 determines that the user is not attempting to add characters that conform the violated rule. On the other hand, if the entered characters are consistent with a rule (e.g., the entered characters "(b" are consistent with a section rule because the section rule indicates that sections start with one or more letters in parentheses, such as "(a)"), the word processor plug-in 132 determines that the user may be attempting to add characters that conform to the unviolated rule. The word processor plug-in 132 can compare the entered characters to some or all of the rules. In response to the comparison(s), the word processor plug-in 132 can generate a list of one or more characters that the user may be attempting to enter. The characters included in the list may be characters that, if added to the entered characters, would result in the combined characters conforming to one or more rules. The enhanced text editor can display the list and the user may be able to select an item in the list. Selection of an item may cause the enhanced text editor to add the selected characters to the already entered characters. Thus, the enhanced text editor may allow the user to add text to the text document without requiring the user to enter all of the characters comprised within the text.

As another example, the word processor plug-in 132 can identify entered characters and compare the entered characters to one or more rules of the style guide and one or more laws and/or legislative codes included in the stored list of laws and/or legislative codes. In particular, the word processor plug-in 132 can compare the entered characters to one or more citation rules. If the word processor plug-in 132 determines based on the comparison that the entered characters are consistent with one or more citation rules, then the word processor plug-in 132 may compare the entered characters with the characters representing the names of one or more laws and/or legislative codes stored in the list to identify which laws and/or legislative codes the user may be attempting to reference. For example, the word processor plug-in 132 may identify laws and/or legislative codes that are represented by characters that at least partially match the entered characters (e.g., identify laws and/or legislative codes in which the entered characters are at least some of the characters that represent the laws and/or legislative codes). Using the identified laws and/or legislative codes and the citation rules, the word processor plug-in 132 can generate a list of one or more characters that the user may be attempting to enter. The characters included in the list may be characters that, if added to the entered characters, would result in the combined characters forming a reference or citation to one of the identified laws and/or legislative codes. The enhanced text editor can display the list and the user may be able to select an item in the list. Selection of an item may cause the enhanced text editor to add the selected characters to the already entered characters. Thus, the enhanced text editor may allow the user to add a complete citation to the text document without requiring the user to enter all of the characters necessary to form a complete citation.

In further embodiments, once the word processor plug-in 132 identifies laws and/or legislative codes that are represented by characters that at least partially match the entered characters, the word processor plug-in 132 may retrieve a copy of some or all of the laws and/or legislative codes and display the content of such laws and/or legislative codes within the enhanced text editor or within a separate window. For example, a copy of laws and/or legislative codes may be stored locally in memory by the publishing device 130. The word processor plug-in 132 can then retrieve, from the local memory, a copy of the law(s) and/or legislative code(s) that includes at least some characters matching the entered characters for display. Alternatively or in addition, a copy of laws and/or legislative codes may be stored by the legislation publishing system 120 in a data store (not shown) or by another system (not shown). The publishing device 130, at the direction of the word processor plug-in 132, can transmit to the legislation publishing system 120 or the other system via the network 110 a request for the law(s) and/or legislative code(s) that includes at least some characters matching the entered characters. Upon receiving the requested law(s) and/or legislative code(s), the enhanced text editor can display the received information. Thus, the user may be able to view the laws and/or legislative codes that include at least some characters matching the entered characters in order to identify the appropriate item to select from the list of possible characters that the user may be attempting to enter.

Alternatively or in addition, the word processor plug-in 132 may implement an artificial intelligence process (e.g., a machine learning process) to provide the auto-complete functionality. For example, the publishing device 130 and/or another computing device (not shown) may have previously trained a citation machine learning model using a training set of properly formatted citations to legal documents (e.g., laws and/or legislative codes) and/or a training set of existing legal documents (e.g., laws and/or legislative codes). Thus, the citation machine learning model may be trained to determine one or more sets of one or more characters that would form a complete, properly formatted citation to an existing law and/or legislative code based on a set of characters provided as an input. As a user enters characters (e.g., as the word processor plug-in 132 receives API calls from the text editor indicating that a cursor moved or the text document has changed), the word processor plug-in 132 may provide the entered characters as inputs to the citation machine learning model. The citation machine learning model may then provide as an output one or more sets of one or more characters that the user may be attempting to enter. The word processor plug-in 132 may cause the enhanced text editor to display the citation machine learning model output. The user may then select one of the citation machine learning model outputs in a manner as described above. As another example, the word processor plug-in 132 may convert the entered characters into a query that is provided to a search engine trained using a machine learning process and a training set of properly formatted citations to laws and/or legislative codes and/or a training set of existing laws and/or legislative codes. The search engine may then return one or more search results that represent characters that the user may be attempting to enter. The word processor plug-in 132 may cause the enhanced text editor to display the search results. The user may then select one of the search results in a manner as described above. As another example, the word processor plug-in 132 may use n-gram or word buckets to identify one or more citations that are most similar to the characters entered by the user. The word processor plug-in 132 may cause the enhanced text editor to display the identified citations. The user may then select one of the results in a manner as described above. Thus, the word processor plug-in 132 may cause the publishing device 130 to use artificial intelligence to predict user inputs and thereby improve the functionality of the publishing device 130 itself.

Once the user has entered some or all of the desired text (e.g., as indicated by the user via a user input, such as the selection of an export or download button displayed within the enhanced text editor), the word processor plug-in 132 can validate the generated markup language code. For example, the word processor plug-in 132 can use one or more rules of the style guide to determine whether the structure of the generated markup language code conforms to the jurisdiction's style guide. As an illustrated example, the style guide may dictate situations in which sections include headings, situations in which paragraphs are numbered or are not numbered, the appropriate indent level of sections, etc. The word processor plug-in 132 can parse through the generated markup language code to identify structural annotations. The word processor plug-in 132 can then compare one or more structural annotations and the corresponding text with one or more rules to identify whether the structural annotations and corresponding text conform with the style guide. If an error is detected by the word processor plug-in 132 (e.g., a structural annotation and/or corresponding text does not conform to a rule), then the word processor plug-in 132 can cause the enhanced text editor to display an error, to display a suggested change to resolve the error, and/or transmit a notification to a user device or a system accessible by the user device indicating results of the validation (e.g., including any errors that may be detected). The word processor plug-in 132 may allow the enhanced text editor to provide a user with the ability to accept a suggested change, to provide a different change, or to ignore an error. In some embodiments, the word processor plug-in 132 may transmit a notification to a user device or a system accessible by the user device indicating results of the validation regardless of whether any errors are detected.

After any errors have been resolved (and/or ignored), the word processor plug-in 132 may provide an option to store, open, and/or export the generated markup language code. For example, the generated markup language code can be exported as a markup language code file (e.g., an XML file), a text document, a PDF, etc. The word processor plug-in 132 can also cause the publishing device 130 to transmit the generated markup language code to the legislation publishing system 120 for further evaluation and modification.

Generally, the generated markup language code is a structural, markup language representation of an approved law. Thus, the generated markup language code includes text reciting how to modify a legislative code. In order for a computing device, such as the publishing device 130 or the legislation publishing system 120, to modify automatically the legislative code without using natural language processing techniques to understand the content of the approved law, the generated markup language code can be modified to include codification annotations (e.g., tags) that provide instructions in the markup language code identifying how a portion of the law affects a portion of the legislative code. For example, the word processor plug-in 132, the codification application 134, or a combination thereof can modify the generated markup language code. For simplicity, the codification application 134 is described herein as the application that modifies the generated markup language code.

A user can view the generated markup language code in the codification application 134 and use the codification application 134 to insert codification annotations in the markup language code. Examples of codification annotations can include "codify:replace," "codify:find-replace," "codify:repeal," "codify: redesignate-para," "codify:annotation," "codify:insert," and/or the like. The codification annotations are described in greater detail below with respect to FIGS. 5A-5H.

In an embodiment, the codification application 134 can assist the user in identifying portions of the markup language code in which codification annotations should be inserted. For example, a citation in an approved law generally refers to another portion of the approved law or a portion of another approved law. However, a citation in the legislative code generally refers to another portion of the legislative code. Thus, the codification application 134 can use a machine learning process to identify citations included in the generated markup language code that should be annotated to reference the corresponding portion of the legislative code. Optionally, the citation machine learning model described above can be repurposed by the codification application 134 to identify possible citations by providing one or more characters included in the generated markup language code as an input to the citation machine learning model. Once the codification application 134 identifies a citation, the codification application 134 may highlight the citation. A user may then quickly identify a citation, select a button or provide a key command to select the citation within a user interface provided by the codification application 134, and insert a codification annotation that references a portion of the legislative code corresponding to the approved law referenced by the citation.

Similarly, the codification application 134 can use a machine learning process to predict codification annotations to insert into the markup language code. For example, the publishing device 130 or another computing device (not shown) can train an annotation prediction machine learning model using a training set of markup language code and corresponding codification annotations. The codification application 134 can parse the markup language code, using portions of the markup language code as an input to the annotation prediction machine learning model to cause the annotation prediction machine learning model to output possible codification annotation(s) corresponding to the provided input. As an illustrative example, the markup language code may include replacement language referencing first text that is to be replaced with second text. A "codify:find-replace" tag may be a codification annotation that indicates how the legislative code is to be modified and may include several fields, such as "path," "find," "replace," and/or the like. The annotation prediction machine learning model may be trained by the publishing device 130 or the other computing device to predict a value for the "path," "find," and/or "replace" fields in a "codify:find-replace" tag and insert the tag in the markup language code when the replacement language is provided as an input. As another example, the codification application 134 can use a machine learning process to identify a legislative code to which a law citation corresponds once the law citation is detected. The codification application 134 may predict the corresponding legislative code based on a legislation machine learning model trained (e.g., by a computer device that may or may not be running the codification application) using a training set of data that includes a mapping between approved laws and portions of the legislative code.

The codification application 134 can validate the markup language code modified with the codification annotations while the codification annotations are being entered or after receiving an indication that all codification annotations have been entered. For example, the codification application 134 can use one or more rules of the style guide to determine whether the structure of the markup language code modified with the codification annotations conforms to the jurisdiction's style guide in a manner as described above. The codification application 134 may transmit a notification to a user device or a system accessible by the user device indicating results of the validation.

The codification application 134 may store the transforms (e.g., the codification annotations and/or any corresponding text) locally in memory of the publishing device 130. Alternatively or in addition, the codification application 134 may cause the publishing device 130 to transmit the transforms to the legislation publishing system 120 for storage in transforms data store 124. Each transform may be stored in an entry associated with the approved law from which the respective transform originates and/or the organic law that created the portion of the legislative code that is to be modified as a result of the respective transform (e.g., the law that originally introduced the text that forms the title, section, paragraph, subparagraph, etc. of the legislative code to be modified).

After the codification application 134 modifies the markup language code with the codification annotations to form annotated markup language code, the annotated markup language code may have the content necessary to allow the publishing device 130 or another computing device (not shown) to update and publish at least a portion of the corresponding legislative code. For example, the word processor plug-in 132, the codification application 134, the publication application 136, or a combination thereof can update and publish the legislative code. For simplicity, the publication application 136 is described herein as the application that updates and publishes the legislative code.

As described herein, the structural annotations in the annotated markup language code identify portions of the approved law and the codification annotations in the annotated markup language code identify portions of the legislative code corresponding to the identified portions of the approved law that are to be modified. Because of the properties of the structural and codification annotations, the publication application 136 does not need to execute natural language processing techniques to understand the content of the approved law in order to determine how the legislative code should be updated. Rather, the publication application 136 can merely apply the current transforms and any past transforms (e.g., transforms generated when processing a previous law) in order to update the legislative code. Application of the transforms by the publication application 136 may cause the publication application 136 to generate transformed markup language code.

For example, the publication application 136 may receive an indication of a legislative code to update. The publication application 136 may then retrieve the transforms associated with the legislative code (e.g., from the local memory of the publishing device 130 and/or from the transforms data store 124 of the legislation publishing system 120). The publication application 136 can apply the transforms to generate the updated legislative code. As an example, the publication application 136 can iterate through each approved law that modifies the legislative code, from most recent to the least recent (e.g., the organic law), and apply, to the respective approved law, the transforms of the approved laws that are more recent than the respective approved law in order from least recent to most recent. Application of a transform to a law may result in a modification of the law. Transforms of the modified law (rather than transforms of the originally approved law) may then be used in subsequent operations. Once all operations are complete, the publication application 136 may be left with a modified organic law. The publication application 136 can then apply the transforms of the modified organic law to form transformed markup language code that represents the updated legislative code (e.g., the publication application 136 can generate text and corresponding tags based on executing instructions corresponding to the transforms in the modified organic law). The publication application 136 can then publish the transformed markup language code.

As an illustrative example, the publication application 136 may identify the transforms associated with the most recently approved law that modifies the legislative code (e.g., law 100) and apply, to the next most recently approved law that modifies the legislative code (e.g., law 99), the transforms of law 100 that modify law 99. Application of these transforms may result in a modified law 99. The publication application 136 may then apply, to the law that was approved just prior to law 99 (e.g., law 98), the transforms of modified law 99 that modify law 98. Application of these transforms may result in a modified law 98. The publication application 136 may then apply, to law 98, the transforms of law 100 that modify law 98. The publication application 136 can repeat this process for each subsequent approved law until the publication application 136 generates a modified organic law (e.g., a modified law 1). The publication application 136 can then apply the transforms of modified law 1 to generate text and corresponding tags that form the markup language code of the updated legislative code.

In further embodiments, the transforms may be associated with an effective time period. For example, certain changes to the legislative code identified in an approved law may take effect on a certain date and/or may no longer be effective after a certain date. Such time periods are generally included in the approved law and thus the codification application 134 may associate a transform with a time period indicating when and for how long the change associated with the transform is effective when inserting the transform in the markup language code. Accordingly, the publication application 136 can selectively apply transforms to the other approved laws, such as by only applying, to other approved laws, transforms that are effective as of a specified date (e.g., a date selected by a user). Furthermore, each transform may be associated with an approved law from which the respective transform originated. Thus, each transform may also be associated with an introduction date (e.g., a date corresponding to the date that the corresponding law was approved). The publication application 136 can then also apply, to other approved laws, transforms that correspond with laws that were approved as of a specified date (e.g., a date selected by a user) and/or that are effective as of a specified date.

As described above, the publication application 136 can then publish the transformed markup language code. For example, the publication application 136 can convert the transformed markup language code into a text document, a PDF, an electronic message, and/or the like that presents the updated legislative code. Alternatively or in addition, the publication application 136 can provide access to the transformed markup language code such that a user device, upon rendering the transformed markup language code using a browser application, displays the updated legislative code in a user interface.

The legislation publishing system 120 can be a computing system configured to perform some or all of the functionality described herein with respect to the publishing device 130. In addition, the legislation publishing system 120 may provide additional functionality, such as allowing a user device 102 to request, on-demand, a version of the legislative code effective on a certain date from the perspective of a user on a certain date. For example, the legislation publishing system 120 may include various modules, components, data stores, and/or the like to provide the structure-based markup language code generation, the auto-completion, generated structure-based markup language code validation, the codification, and the legislative code publishing functionality described herein. For example, the legislation publishing system 120 may include a legislation drafter and validator 121, a legislation codifier 122, a code publisher 123, a transforms data store 124, and a style guide data store 125.

The legislation drafter and validator 121 may be configured to perform some or all of the functionality described herein with respect to the word processor plug-in 132. For example, the legislation drafter and validator 121 may provide a user device 102 or the publishing device 130 with access to a remote or network-based enhanced text editor that includes the functionality of the word processor plug-in 132 described herein. Thus, the legislation drafter and validator 121 may generate markup language code.

Similarly, the legislation codifier 122 may be configured to perform some or all of the functionality described herein with respect to the codification application 134. For example, the legislation codifier 122 may receive generated markup language code from the publishing device 130 (via the word processor plug-in 132), the user device 102, and/or the legislation drafter and validator 121. The legislation codifier 122 may provide a user device 102 or the publishing device 130 with access to a remote or network-based application that includes the functionality of the codification application 134 described herein. Thus, the legislation codifier 122 may generate annotated markup language code using the received generated markup language code.

The code publisher 123 may be configured to perform some or all of the functionality described herein with respect to the publication application 136. For example, the code publisher 123 may receive annotated markup language code from the publishing device 130 (via the codification application 134), the user device 102, and/or the legislation codifier 122. The code publisher 123 may generate user interface data that, when rendered by the user device 102 or the publishing device 130, causes the user device 102 or publishing device 130 to display a user interface allowing a user to select a desired legislative code, an effective date of the legislative, and/or a date of a user's perspective of the desired legislative code. Based on the options selected by a user via the user device 102 or publishing device 130, the code publisher 123 can publish an updated legislative code in a manner as described herein with respect to the publication application 136. For example, the code publisher 123 can update the user interface data such that the rendered user interface displays the requested legislative code.

Thus, the publishing device 130 and the legislation publishing system 120 may operate alone or in combination in order to generate the markup language code, to generate the annotated markup language code, and/or to publish a requested legislative code.

The transforms data store 124 stores transforms formed based on the generation of the annotated markup language code. A transform may be stored in an entry associated with the approved law from which the transform originated and/or the approved law that is modified by the transform. A transform may further be associated with an effective time period that is stored in the transforms data store 124 While the transforms data store 124 is depicted as being located internal to the legislation publishing system 120, this is not meant to be limiting. For example, not shown, the transforms data store 124 can be located external to the legislation publishing system 120.

The style guide data store 125 stores one or more rules corresponding to one or more style guides of one or more jurisdictions. For example, each rule may be stored in an entry associated with a style guide and/or a jurisdiction. While the style guide data store 125 is depicted as being located internal to the legislation publishing system 120, this is not meant to be limiting. For example, not shown, the style guide data store 125 can be located external to the legislation publishing system 120.

The legislation publishing system 120 may be a single computing device, or it may include multiple distinct computing devices, such as computer servers, logically or physically grouped together to collectively operate as a server system. The components of the legislation publishing system 120 can each be implemented in application-specific hardware (e.g., a server computing device with one or more ASICs) such that no software is necessary, or as a combination of hardware and software. In addition, the modules and components of the legislation publishing system 120 can be combined on one server computing device or separated individually or into groups on several server computing devices. In some embodiments, the legislation publishing system 120 may include additional or fewer components than illustrated in FIG. 1.

In some embodiments, the features and services provided by the legislation publishing system 120 may be implemented as web services consumable via the communication network 110. In further embodiments, the legislation publishing system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Example Block Diagrams for Publishing Legislative Code

Figure 2:
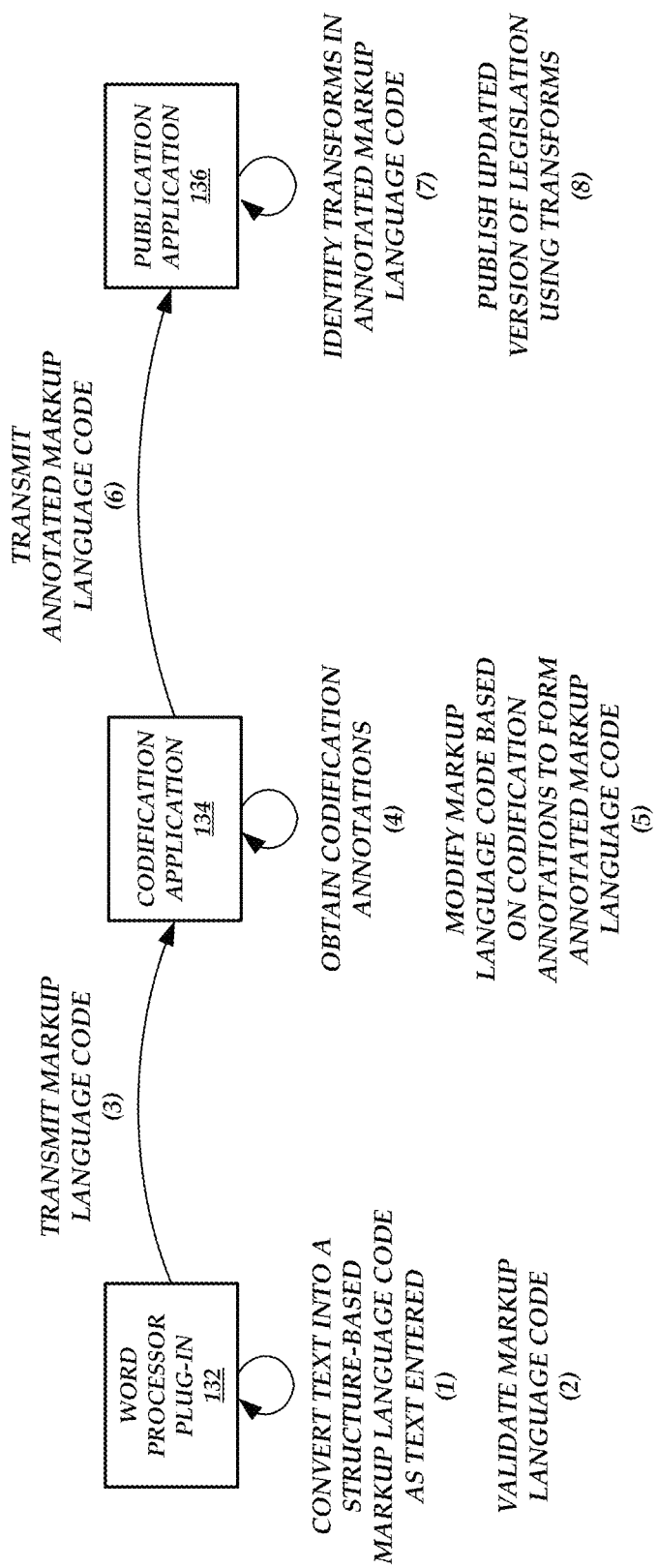
FIG. 2 is a flow diagram illustrating the operations performed by the components of the operating environment of FIG. 1 to publish legislative code, according to one embodiment.

FIG. 2 is a flow diagram illustrating the operations performed by the components of the operating environment 100 of FIG. 1 to publish legislative code, according to one embodiment. In particular, the flow diagram illustrates the operations performed by the publishing device 130. As illustrated in FIG. 2, the word processor plug-in 132 converts text into structure-based markup language code as text is entered at (1). For example, the word processor plug-in 132 may repeat this process each time an API call is received indicating that the cursor has moved and/or that the text document has changed. The structure-based markup language code generated by the word processor plug-in 132 may include the entered text and structural annotations. The word processor plug-in 132 may use a machine learning process in generating the markup language code as described herein. Alternatively, the word processor plug-in 132 converts text into structure-based markup language code after receiving an indication that the text is fully entered.

Once the text is partially or fully entered, the word processor plug-in 132 may receive an indication that this is the case. For example, the word processor plug-in 132 may receive the indication via a user input, such as the selection of an export or download button displayed within the enhanced text editor. Once the indication is received, the word processor plug-in 132 can validate the markup language code at (2). For example, the word processor plug-in 132 can compare the markup language code with one or more rules of a jurisdiction's style guide to ensure that the markup language code conforms with the rules. If any rule violations exist, the word processor plug-in 132 can cause the enhanced text editor to display the violations and request correction and/or permission to automatically correct the violations. Alternatively, the word processor plug-in 132 can validate the markup language code as the text is being entered.

After the markup language code is validated, the word processor plug-in 132 can transmit the markup language code to the codification application 134 at (3). The codification application 134 may obtain codification annotations at (4). For example, the codification annotations may be received via user input or determined by the codification application 134 using a machine learning process. Once the codification annotations are obtained, the codification application 134 modifies the markup language code based on the codification annotations at (5) to form annotated markup language code. The codification application 134 can then transmit the annotated markup language code to the publication application 136 at (6).

The publication application 136 can identify transforms in the annotated markup language code at (7). The publication application 136 may then publish an updated version of legislation using the transforms at (8). For example, the publication application 136 may apply the transforms in the annotated markup language code and other transforms associated with the legislation corresponding to the annotated markup language code to form transformed markup language code that represents the updated legislative code. The publication application 136 can then publish the transformed markup language code.

Figure 3A:
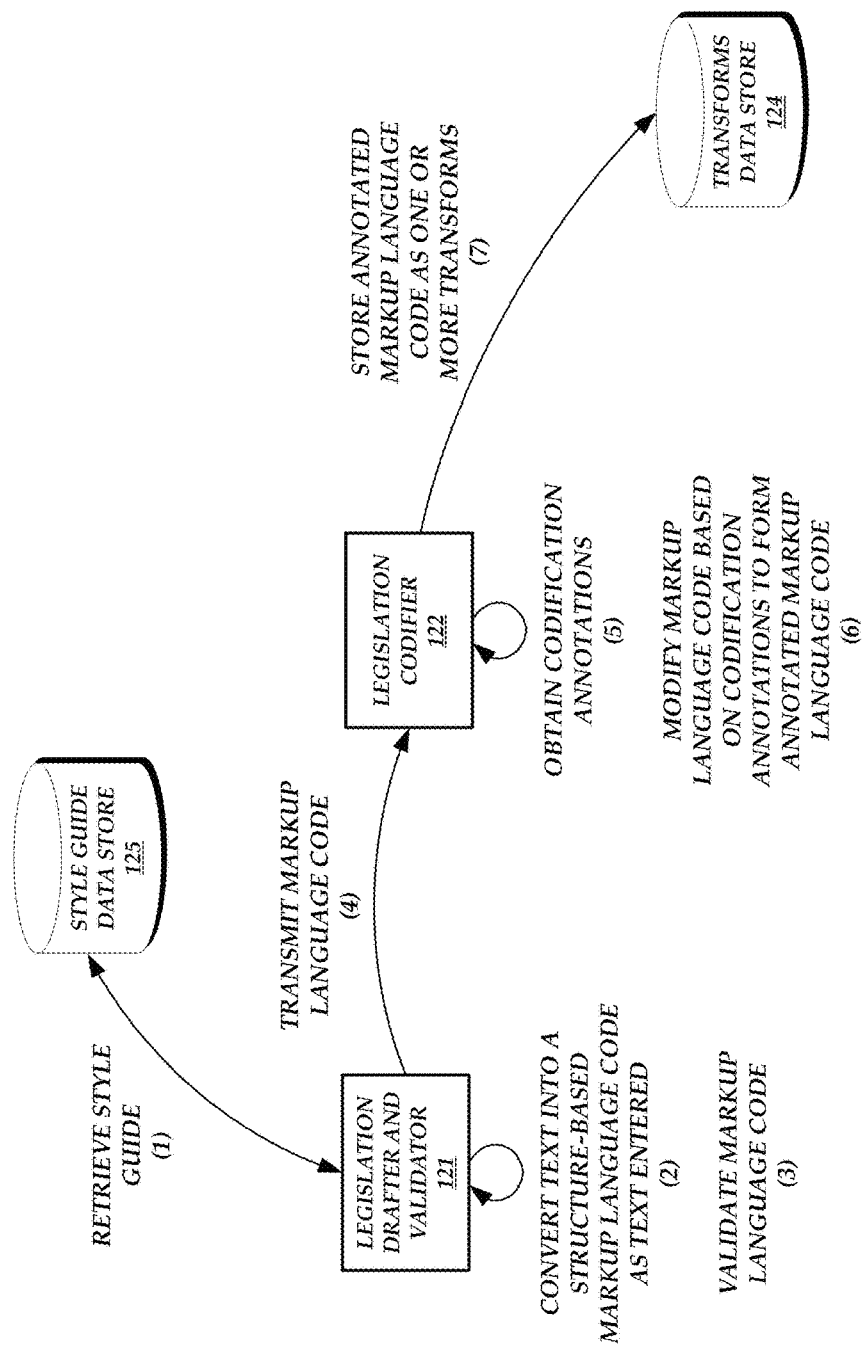
FIGS. 3A-3B are flow diagrams illustrating the operations performed by the components of the operating environment of FIG. 1 to publish legislative code, according to one embodiment.
Figure 3B:
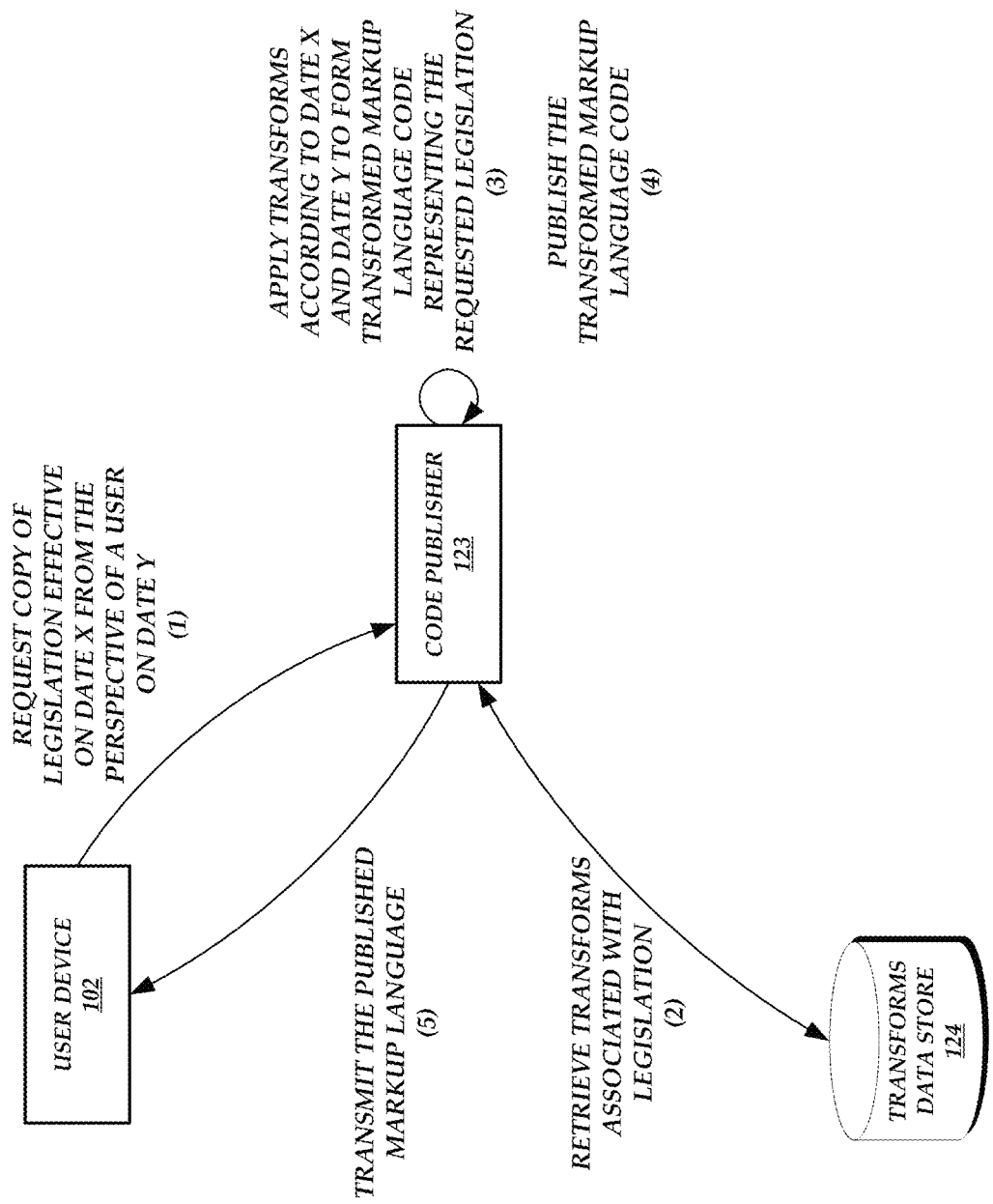

FIGS. 3A-3B are flow diagrams illustrating the operations performed by the components of the operating environment 100 of FIG. 1 to publish legislative code, according to one embodiment. In particular, the flow diagram illustrates the operations performed by the legislation publishing system 120. As illustrated in FIG. 3A, the legislation drafter and validator 121 retrieves a style guide from the style guide data store 125 at (1). The retrieved style guide may include one or more rules corresponding to a style guide and/or jurisdiction selected by a user. The legislation drafter and validator 121 converts text into structure-based markup language code as text is entered at (2). For example, the legislation drafter and validator 121 may repeat this process each time an API call is received (e.g., from the publishing device 130 or from a network-accessible text editor provided by the legislation drafter and validator 121) indicating that the cursor has moved and/or that the text document has changed. The structure-based markup language code generated by the legislation drafter and validator 121 may include the entered text and structural annotations that conform with the style guide rules. The legislation drafter and validator 121 may use a machine learning process in generating the markup language code as described herein.

Once the markup language code is partially or fully entered, the legislation drafter and validator 121 may receive an indication that this is the case. For example, the legislation drafter and validator 121 may receive the indication via a user input, such as the selection of an export or download button displayed within the enhanced text editor running on the publishing device 130 or within the network-accessible text editor provided by the legislation drafter and validator 121. Once the indication is received, the legislation drafter and validator 121 can validate the markup language code at (3). For example, the legislation drafter and validator 121 can compare the markup language code with the retrieved rules to ensure that the markup language code conforms with the rules. If any rule violations exist, the legislation drafter and validator 121 can display or cause the enhanced text editor to display the violations and request correction and/or permission to automatically correct the violations.

After the markup language code is validated, the legislation drafter and validator 121 can transmit the markup language code to the legislation codifier 122 at (4). The legislation codifier 122 may obtain codification annotations at (5). For example, the codification annotations may be received via user input or determined by the legislation codifier 122 using a machine learning process. Once the codification annotations are obtained, the legislation codifier 122 modifies the markup language code based on the codification annotations at (6) to form annotated markup language code. The legislation codifier 122 can then store the annotated markup language code as one or more transforms in the transforms data store 124 at (7).

As illustrated in FIG. 3B, the user device 102 may request a copy of legislation effective on date X from the perspective of a user on date Y at (1). The request may be transmitted to the code publisher 123. In response to receiving the request, the code publisher 123 may retrieve transforms associated with the legislation from the transforms data store 124 at (2). For example, the retrieved transforms may be those transforms that are associated with an effective time period that includes date X and that are associated with an approved law introduced prior to or on date Y.

The code publisher 123 may apply transforms according to date X and date Y to form transformed markup language code representing the requested legislation at (3). For example, the code publisher 123 can iterate through each approved law that modifies the legislative code that includes transforms effective as of date X and that was introduced prior to or on date Y, from most recent to the least recent (e.g., the organic law), and apply, to the respective approved law, the transforms of the approved laws that are more recent than the respective approved law in order from least recent to most recent. Application of a transform to a law may result in a modification of the law. Transforms of the modified law (rather than transforms of the originally approved law) may then be used in subsequent operations. Once all operations are complete, the code publisher 123 may be left with a modified organic law. The code publisher 123 can then publish the transformed markup language code at (4). For example, the coder publisher 123 can apply the transforms of the modified organic law to form the transformed markup language code that represents the updated legislative code (e.g., the code publisher 123 can generate text and corresponding tags based on executing instructions corresponding to the transforms in the modified organic law).

The code publisher 123 can then transmit the published transformed markup language code to the user device 102 at (5). For example, the published transformed markup language code may be a text document, a PDF document, an markup language code file, and/or the like. As another example, the published transformed markup language code may be in the form of user interface data such that rendering the user interface data causes the user device 102 to display a user interface that includes the requested legislation.

Example Word Processor Plug-in User Interfaces

Figure 4A:
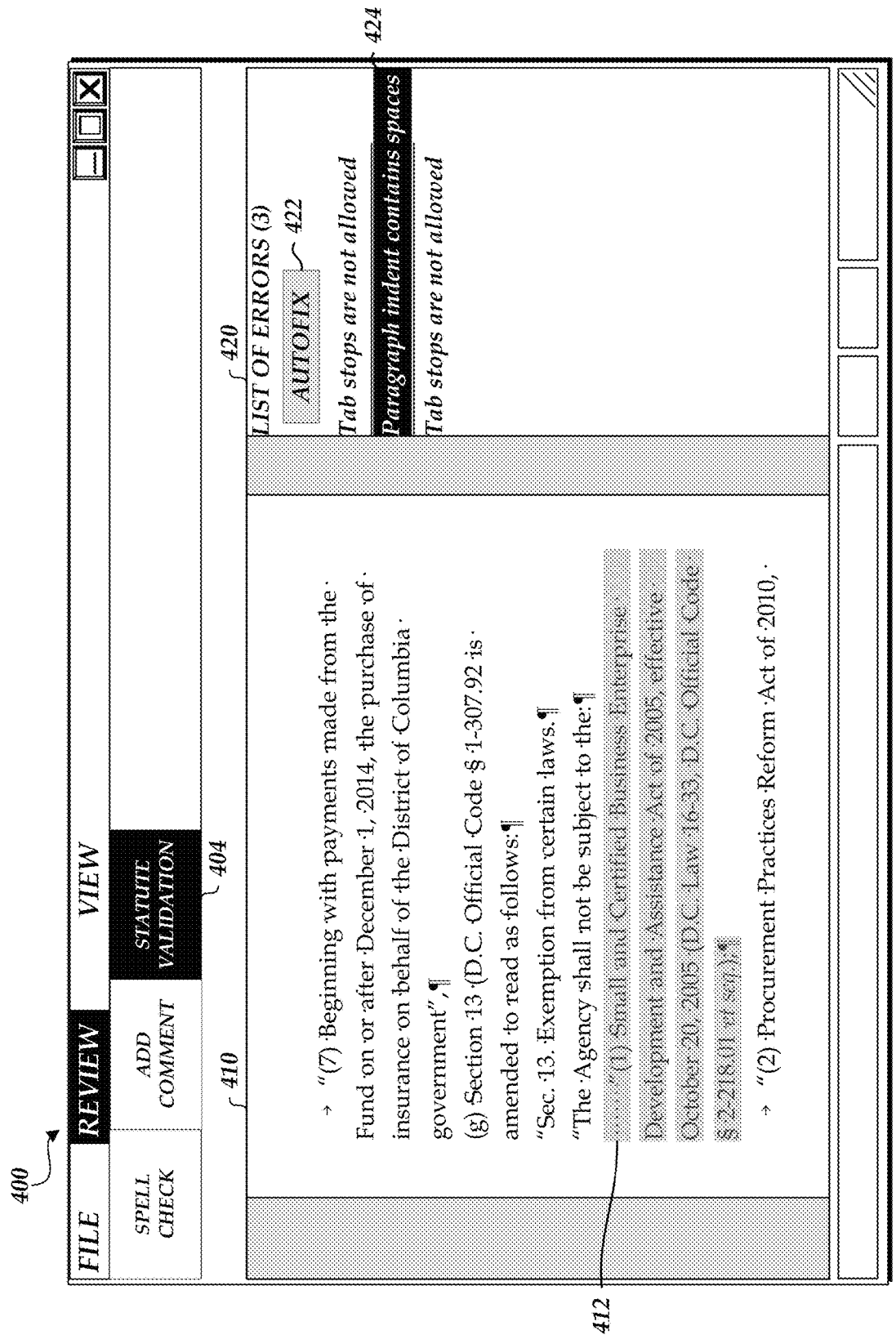
FIGS. 4A-4B illustrate a user interface displaying an enhanced text editor.
Figure 4B:
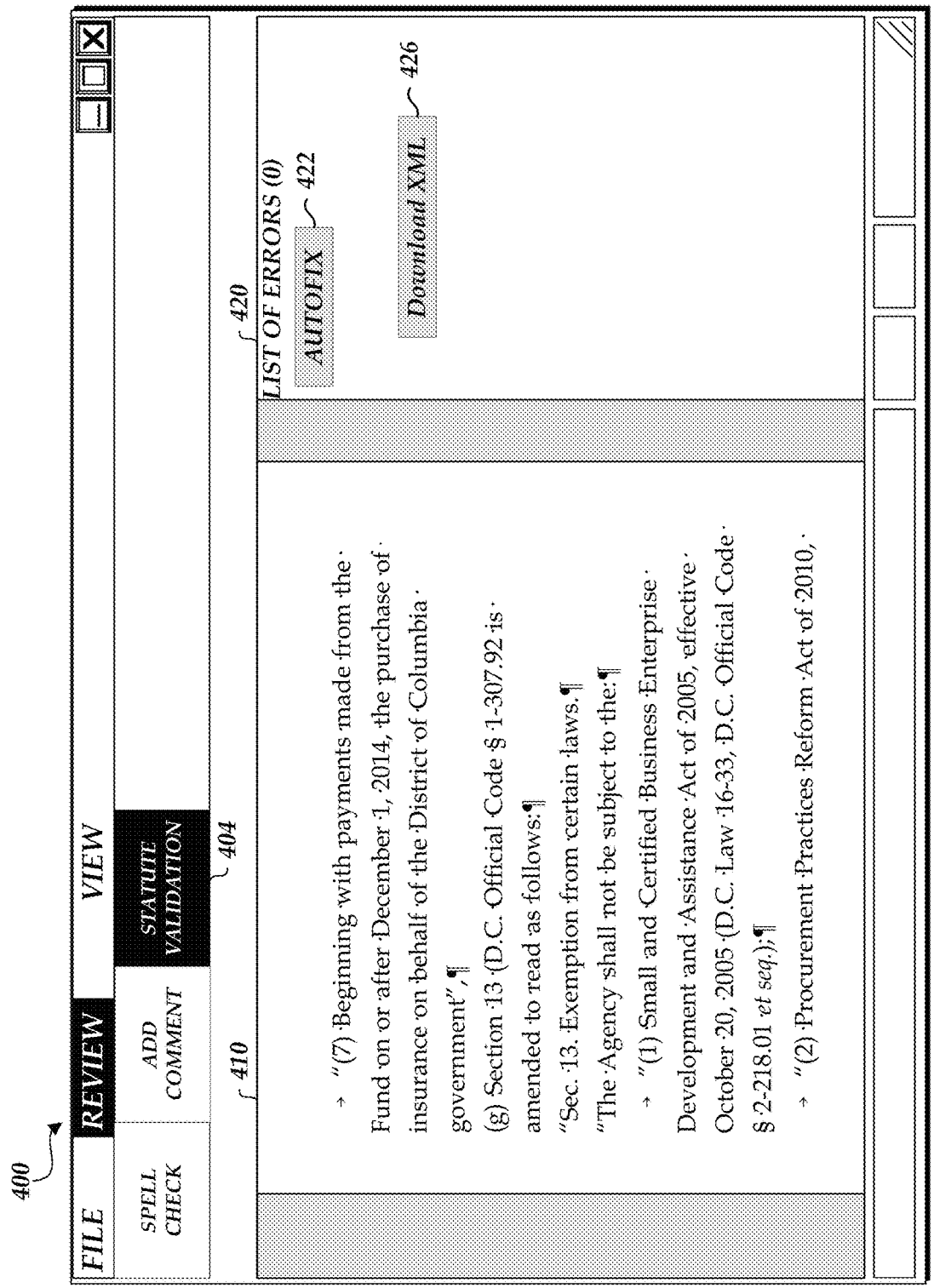

FIGS. 4A-4B illustrate a user interface 400 displaying an enhanced text editor. The user interface 400 may be displayed by the publishing device 130 and/or the user device 102 (e.g., if the user device 102 accesses the network-based text editor provided by the legislation publishing system 120).

As illustrated in FIG. 4A, a text document is displayed in window 410. In addition, a "review" tab that includes a statute validation button 404 is displayed in the user interface 400. The statute validation button 404 may be displayed in the enhanced text editor when the word processor plug-in 132 is enabled. When selected, the statute validation button 404 causes the user interface 400 to display window 420.

Window 420 displays a list of errors that may be present in the text document displayed in the window 410. Specifically, the errors may be errors determined as the user enters text in the text document and/or errors determined after the word processor plug-in 132 (or legislation drafter and validator 121) validates the text document. Thus, the errors may be errors that are identified based on a violation of one or more rules of a jurisdiction's style guide. The window 420 may identify a number of errors and/or each individual error. Each individual error may be selectable. For example, selecting an error may cause text in the text document that corresponds with the error to be highlighted. As an illustrative example, error 424 is selected the window 420. Thus, the text corresponding to the error 424, text 412, is highlighted in the window 410. Error 424 indicates that a paragraph indent contains spaces rather than, for example, a tab. As shown in the text 412, the first line of the text 412 is indented with spaces rather than with a tab. Selection of an error may also cause the user interface 400 to provide one or more suggestions for resolving the error (not shown). Alternatively, a user may select autofix button 422, which causes the word processor plug-in 132 (or the legislation drafter and validator 121) to automatically resolve the error.

As illustrated in FIG. 4B, a user selected the autofix button 422 or manually resolved each of the displayed errors. Thus, the window 420 no longer displays any errors. In addition, the text "(1) Small and Certified Business Enterprise) in the window 410 is no longer indented with spaces. Rather, this text is indented with a tab. Once all errors have been resolved, the user interface 400 may display a download XML button 426 in the window 420.

Selection of the download XML button 426 may cause the word processor plug-in 132 (or the legislation drafter and validator 121) to generate a text document, a PDF, an XML file, and/or the like that is associated with or otherwise includes markup language code corresponding to the text entered in the window 410. For example, the markup language code may include the text entered in the window 410 along with structural tags bracketing some or all of the text.

The task of navigating a document displayed in a window to locate errors can be burdensome and time consuming for users, especially if the users do not know all of the style guide rules. Typically, the user can attempt to locate errors by opening a separate window to display the style guide, and then comparing the style guide to portions of the text document. For example, the user can attempt to locate rules in the style guide by navigating a table of contents or other navigational structure. However, the style guide generally includes several layers of sections and subsections, requiring the user to navigate through several layers of the style guide to arrive at a rule of interest. This navigation can include selecting various links and/or opening different windows within a user interface. Further, in many cases, the rules are not accurately or intuitively organized, requiring the user to perform additional navigation or keyword searching. Thus, the user frequently has to perform numerous navigational steps to attempt to identify rules in the style guide, and then has to perform additional navigational steps to view different portions of the text document for comparing with the style guide rules. In addition, despite performing these navigational steps, the user may still be unsuccessful in locating errors in the text document.

The user interface 400 of FIGS. 4A-4B, however, significantly reduces this problem, allowing users to view and/or correct errors in the document with fewer steps. For example, in the embodiments described herein, the word processor plug-in 132 (or legislation drafter and validator 121) may identify errors in the text document as the user enters text in the text document and display such errors in the window 420. This allows the user to bypass the navigational structure of the style guide because the user is not required to perform any additional navigational steps (e.g., opening and navigating through a style guide) in order for a list of errors to be generated and displayed. In addition, while the window 420, which displays a partial or complete list of errors in the text document, is separate from the window 410 that displays the text document, both windows 410 and 420 can be presented simultaneously within the user interface 400 in a manner as depicted in FIGS. 4A-4B. Thus, via a single navigational step (e.g., the selection of an error identified in the window 420), the user can view both an identification of the error (e.g., in window 420) and the location of the error in the text document (e.g., in window 410) at the same time. Accordingly, programmatically identifying errors in the text document and automatically presenting the user with the list of errors in a window adjacent to the window displaying the text document results in an improved user interface that improves the speed of the user's navigation. This can be particularly true for computing devices with small screens, where a smaller amount of information (e.g., a fewer number of style guide rules, a smaller portion of the text document, etc.) can be displayed to the user at any given time and therefore navigation of larger documents and/or style guides is more difficult.

Example Codification Annotations

FIGS. 5A-5I illustrate a user interface 500 displaying example structural and codification annotations. The user interface 500 may be displayed by the publishing device 130 and/or the user device 102 (e.g., if the user device 102 accesses the network-based application provided by the legislation codifier 122). As illustrated in FIGS. 5A-5I, the transforms are co-located with legal text describing the transforms (e.g., a transform includes content and/or tags describing the transform and is therefore located at the position of the corresponding content and/or tags).

As illustrated in FIG. 5A, the user interface 500 includes a window 510 showing a modified version of the markup language code generated by the word processor plug-in 132 (or the legislation drafter and validator 121). Example structural annotations include <section> tag 512, <num> tag, <text> tag, and <para> tag, among others. The <section> tag may further include a field "codify:doc" that identifies the approved law to which the transform described below applies. Specifically, the modified version of the markup language code further includes a codification annotation <codify:replace> 514. The transform thus includes the <codify:replace> tag 514 and the content within the <para> tag that the <codify:replace> tag 514 is comprised within (e.g., "<num>(2)</num>" and "<text> Provide insurance for District real property assets and District personal property assets.</text>"). The <codify:replace> tag 514 is a codification annotation that instructs the publication application 136 (or the code publisher 123) to replace the section identified in the "path" field of the <codify:replace> tag 514 of the approved law identified in the <section> tag 512 with the content in the transform (e.g., "<num>(2)</num>" and "<text> Provide insurance for District real property assets and District personal property assets.</text>").

As illustrated in FIG. 5B, the window 510 displays codification annotation <codify:find-replace> 516, <find> 518, and <replace> 520. The <codify:find-replace> tag 516 is a codification annotation that instructs the publication application 136 (or the code publisher 123) to find each instance of the text within the <find> tag 518 (e.g., "The Anatomical Board, human tissue banks, and anatomical gifts;") and replace that text with the text within the <replace> tag 520 (e.g., "Human tissue banks and anatomical gifts;") in the approved law and section referenced in the "doc" and "path" fields in the <codify:find-replace> tag 516. The <codify:find-replace> tag 516 may further include a "count" field that indicates a number of times that the find and replace should occur.

Figure 5C:
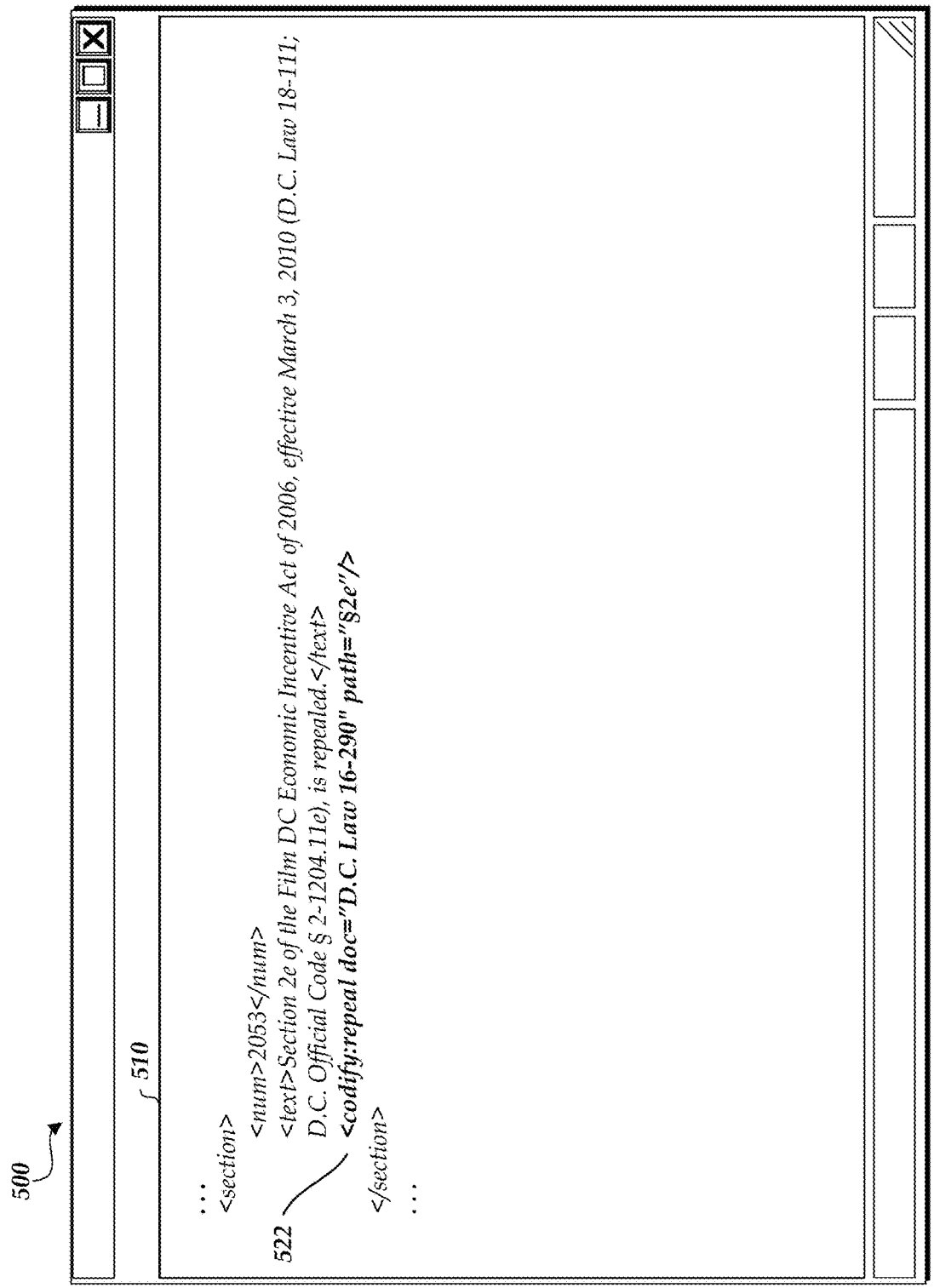

As illustrated in FIG. 5C, the window 510 displays codification annotation <codify:repeal> 522. The <codify:repeal> tag 522 is a codification annotation that instructs the publication application 136 (or the code publisher 123) to repeal the section referenced in the "path" field of the <codify:repeal> tag 522 of the approved law referenced in the "doc" field of the <codify:repeal> tag 522.

Figure 5D:
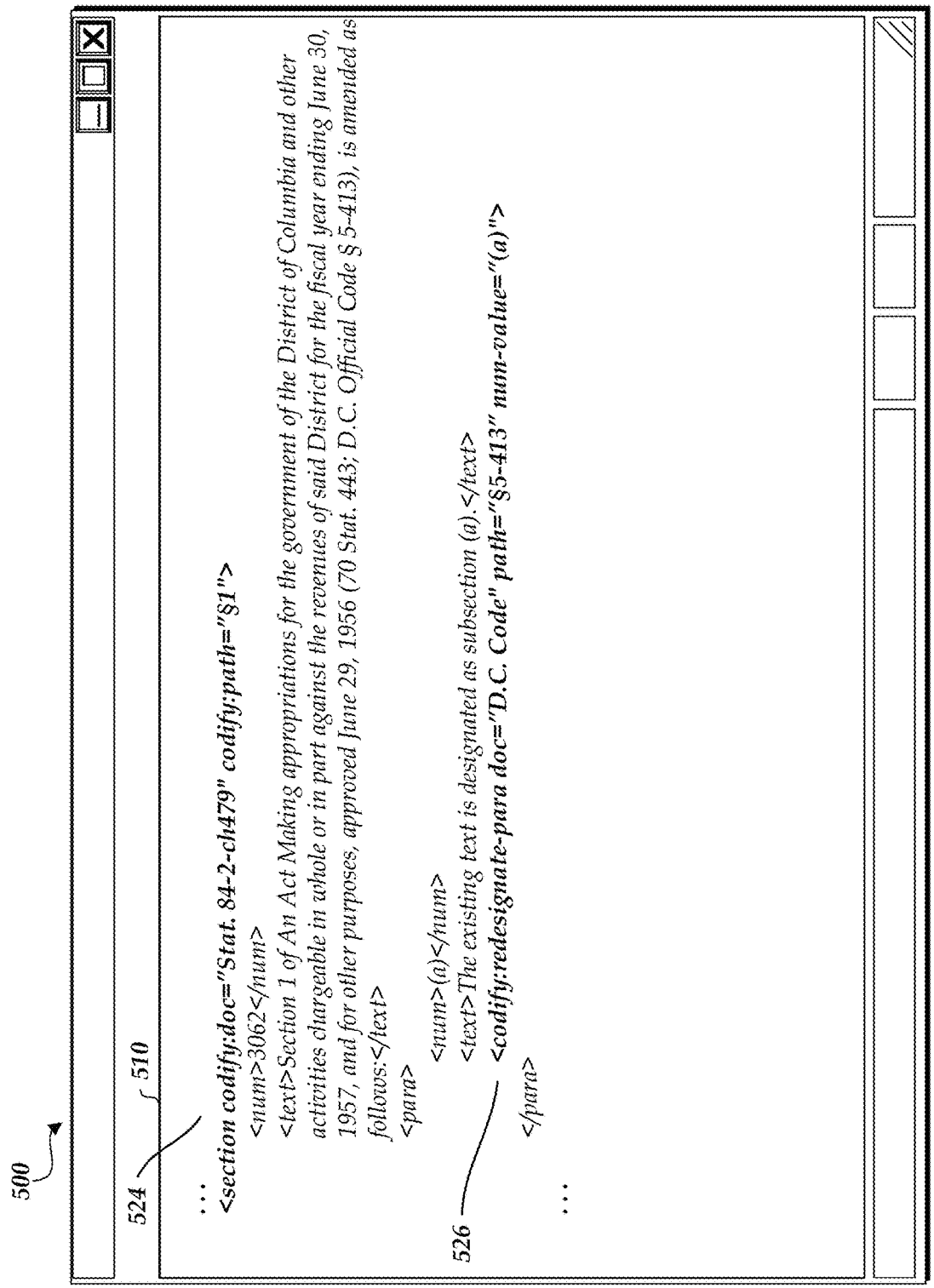

As illustrated in FIG. 5D, the window 510 displays codification annotation <codify:redesignate-para> 526. The <codify:redesignate-para> tag 526 is a codification annotation that instructs the publication application 136 (or the code publisher 123) to redesignate the section referenced in the "path" field of the <codify:redesignate-para> tag 526 of the approved law referenced by the "codify:doc" and "codify:path" fields in <section> tag 524 as a new section or subsection according to the "num-value" field in the <codify:redesignate-para> tag 526 (e.g., as subsection "(a)").

Figure 5E:
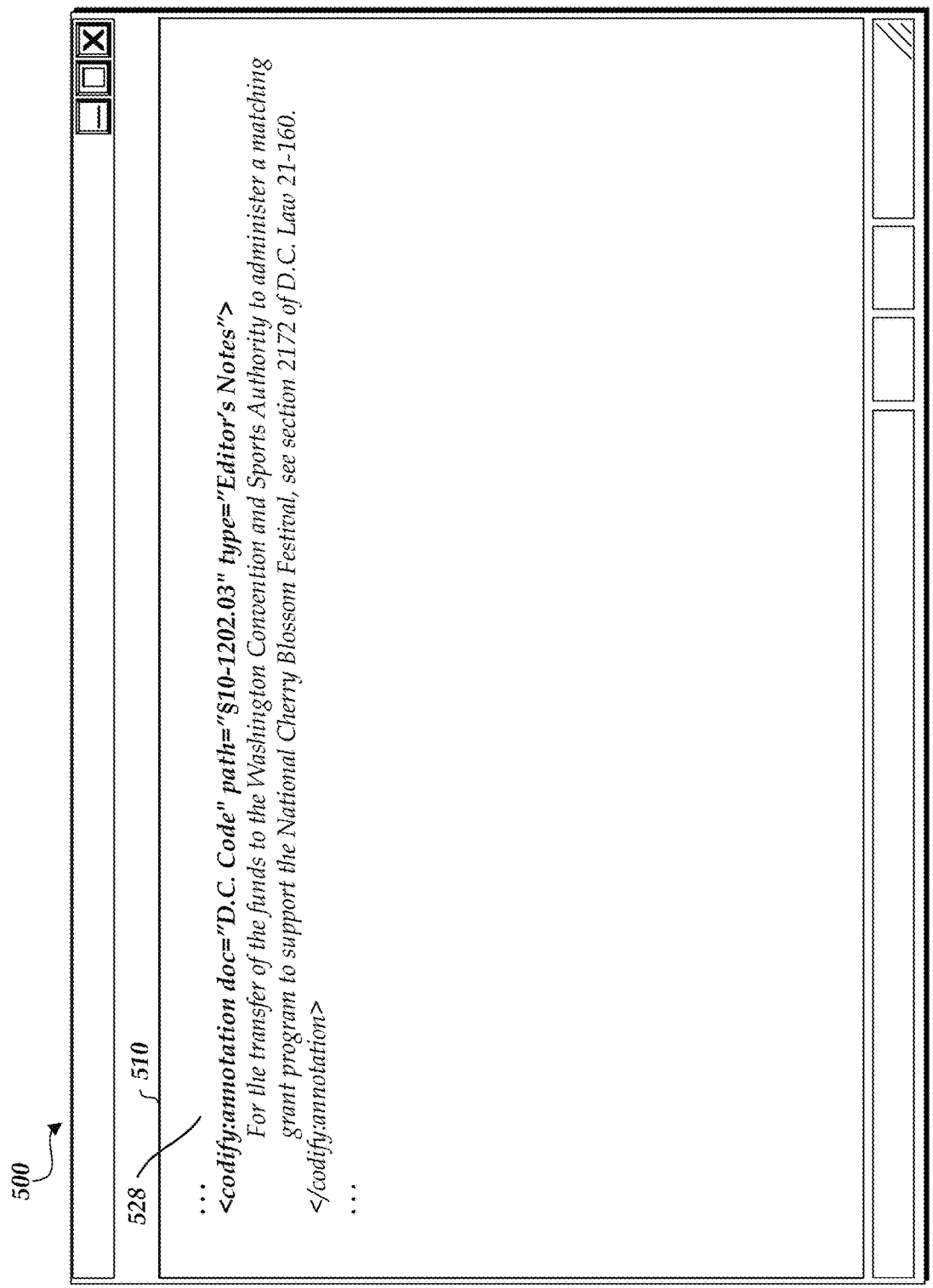

As illustrated in FIG. 5E, the window 510 displays codification annotation <codify:annotation> 528. The <codify:annotation> tag 528 is a codification annotation that instructs the publication application 136 (or the code publisher 123) to include an annotation with the text within the <codify:annotation> tag 528 (e.g., "For the transfer of the funds to the Washington Convention and Sports Authority to administer a matching grant program to support the National Cherry Blossom Festival, see section 2172 of D.C. Law 21-160.") within the section and approved law identified by the "doc" and "path" fields in the <codify:annotation> tag 528. This type of annotation may be an "Editor's Notes" annotation, as indicated by the "type" field in the <codify:annotation> tag 528.

Figure 5F:
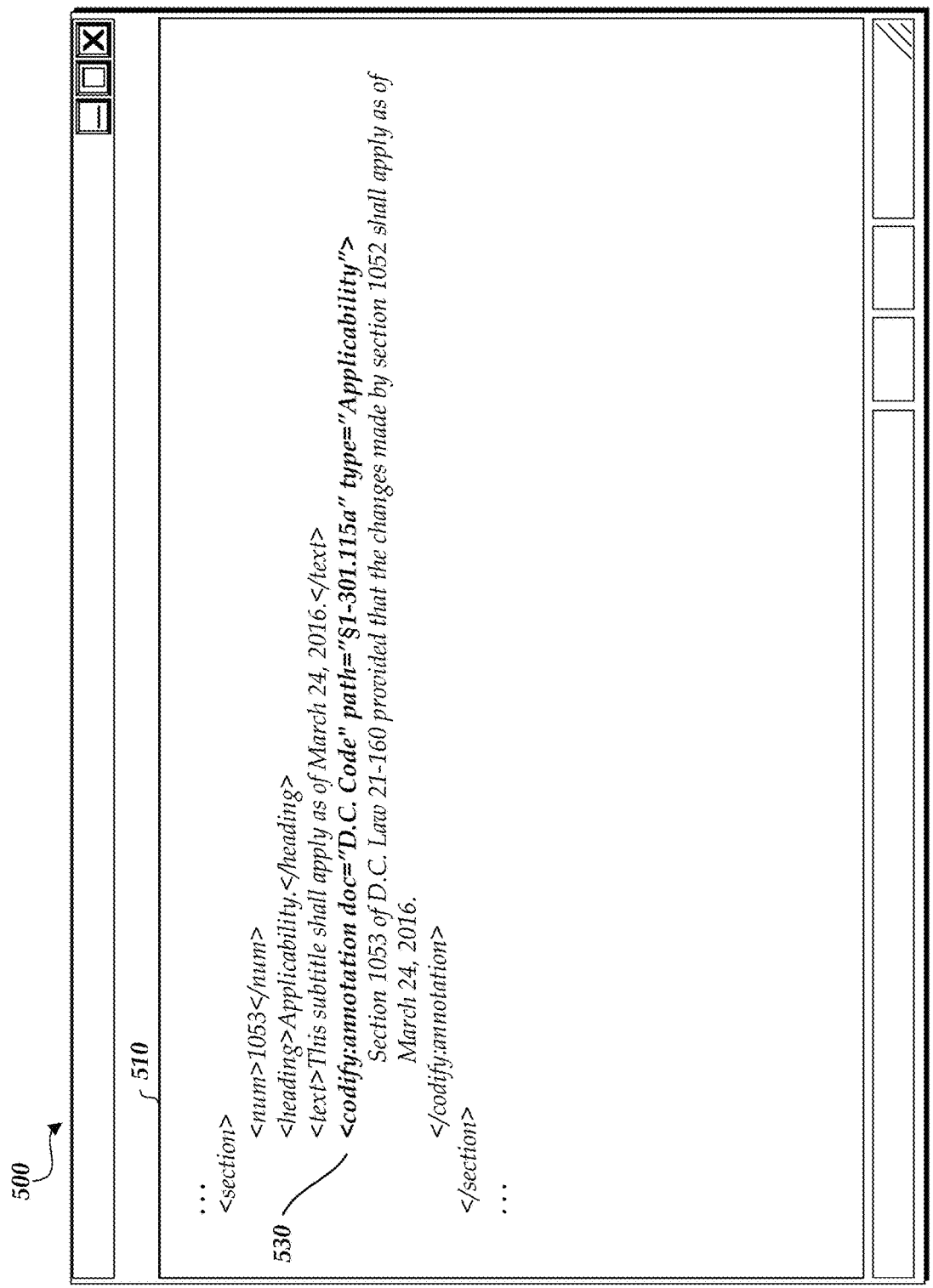

As illustrated in FIG. 5F, the window 510 displays codification annotation <codify:annotation> 530. The <codify:annotation> tag 530 is a codification annotation that instructs the publication application 136 (or the code publisher 123) to include an annotation with the text within the <codify:annotation> tag 530 (e.g., "Section 1053 of D.C. Law 21-160 provided that the changes made by section 1052 shall apply as of Mar. 24, 2016.") within the section and approved law identified by the "doc" and "path" fields in the <codify:annotation> tag 530. This type of annotation may be an "Applicability" annotation, as indicated by the "type" field in the <codify:annotation> tag 530.

Figure 5G:
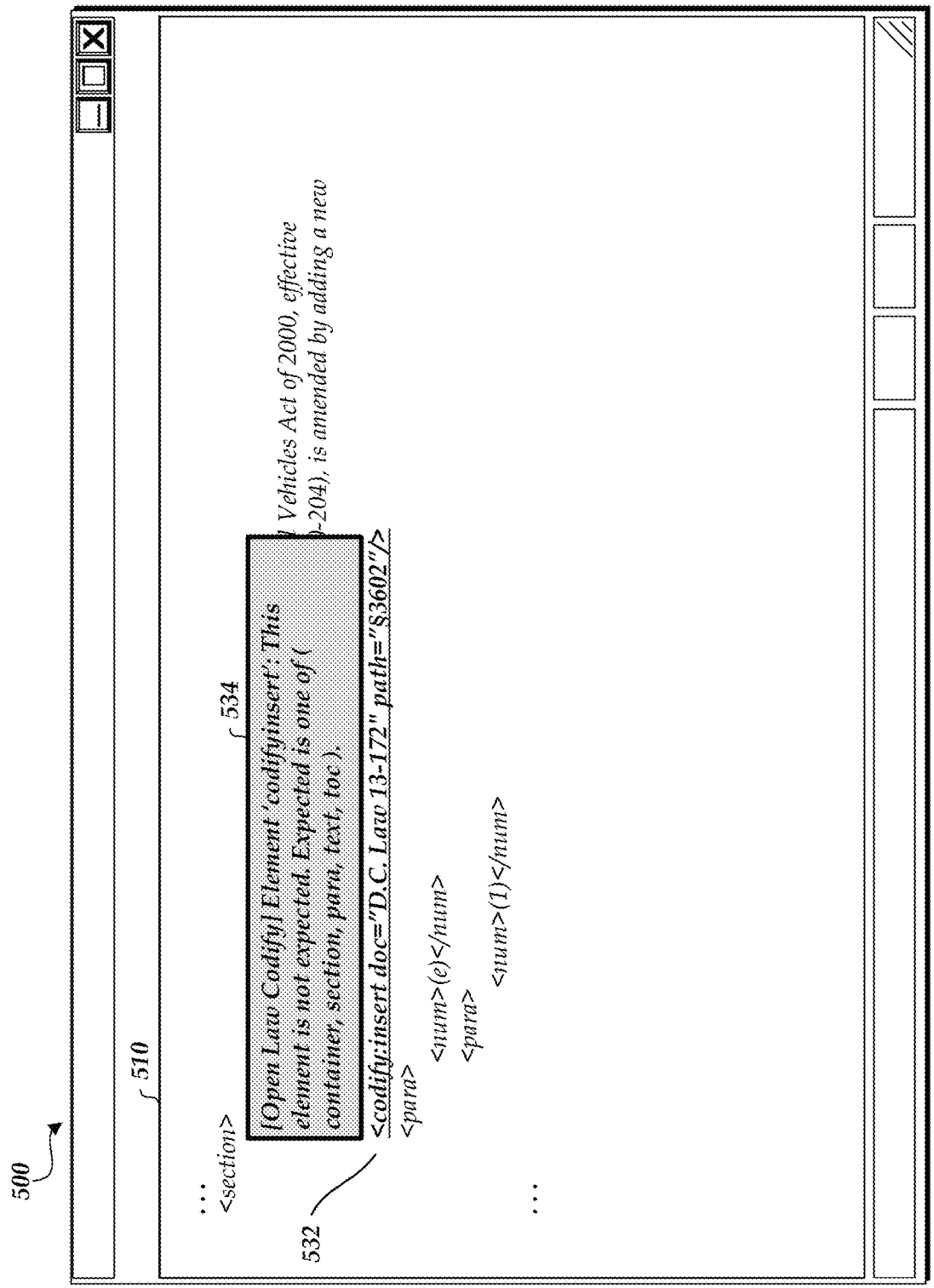

As illustrated in FIG. 5G, a user may be attempting to enter a codification annotation <codify:insert> 532 in the window 510. However, the user may not have inserted the codification annotation using the proper syntax. Thus, the window 510 displays a definition error box 534 that displays the syntax that must be used to properly insert the <codify:insert> tag 532.

Figure 5H:
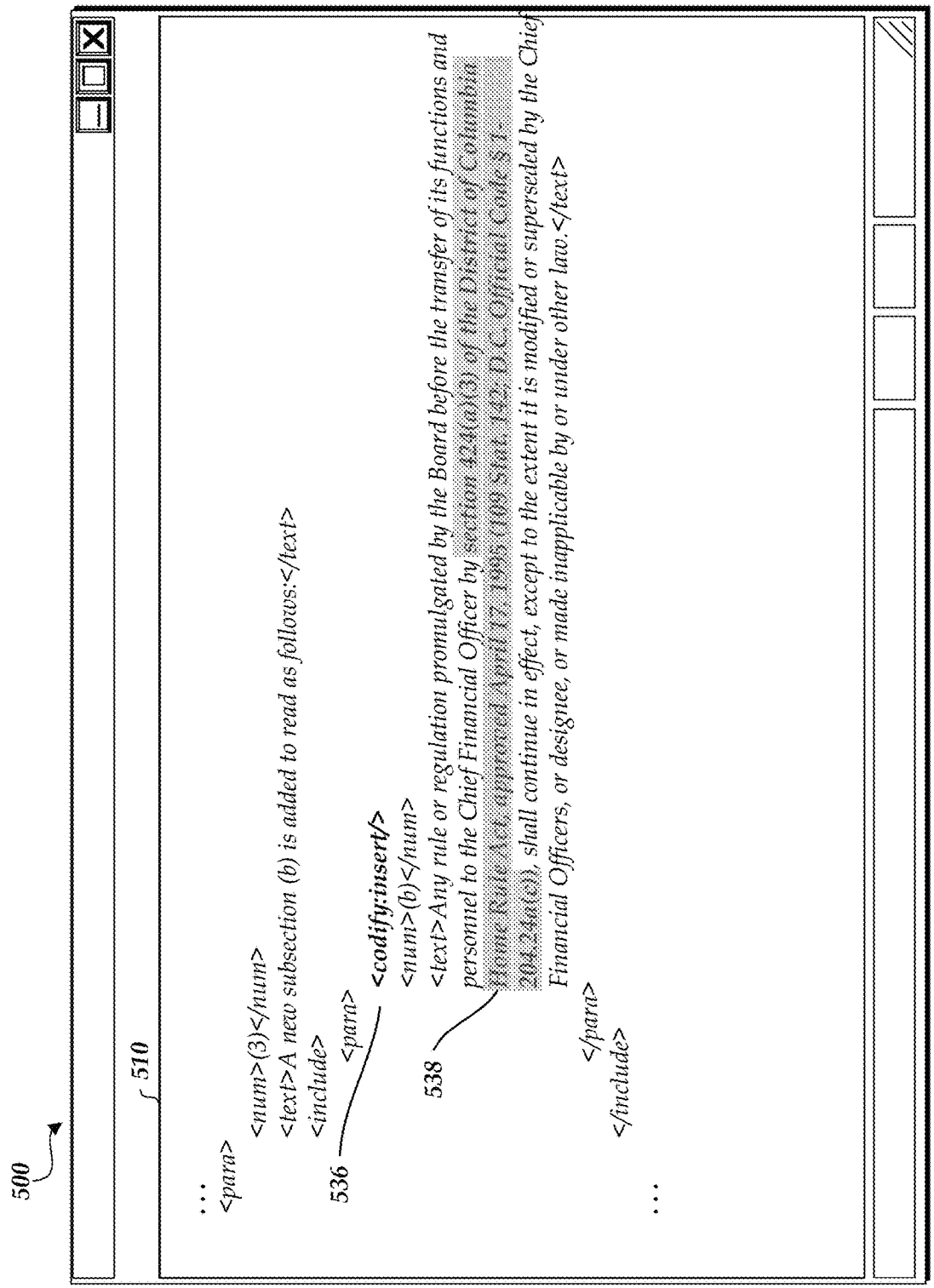

As illustrated in FIG. 5H, a user has properly entered codification annotation <codify:insert> 536 in window 510. The <codify:insert> tag 536 is a codification annotation that instructs the publication application 136 (or the code publisher 123) to insert the content in the transform that includes the <codify:insert> tag 536 (e.g., the content within the <para> tag that includes the <codify:insert> tag 536, such as "<num>(b)</num>" and "<text> Any rule or regulation promulgated by the Board before the transfer of its functions and personnel to the Chief Financial Officer by section 424(a)(3) of the District of Columbia Home Rule Act, approved Apr. 17, 1995 (109 Stat. 142; D.C. Official Code § 1-204.24a(c)), shall continue in effect, except to the extent it is modified or superseded by the Chief Financial Officers, or designee, or made inapplicable by or under other law.</text>") in a section and approved law identified in a previous <section> tag (not shown).

As described herein, the codification application 134 (or legislation codifier 122) can use a machine learning process to identify law citations in the markup language code. As an example, when the codification application 134 (or legislation codifier 122) identifies a possible citation, the codification application 134 (or legislation codifier 122) can highlight the corresponding text. As an illustrative example, the codification application 134 (or legislation codifier 122) identifies text 538 as possibly including a citation and thus the text 538 is highlighted.

Figure 5I:
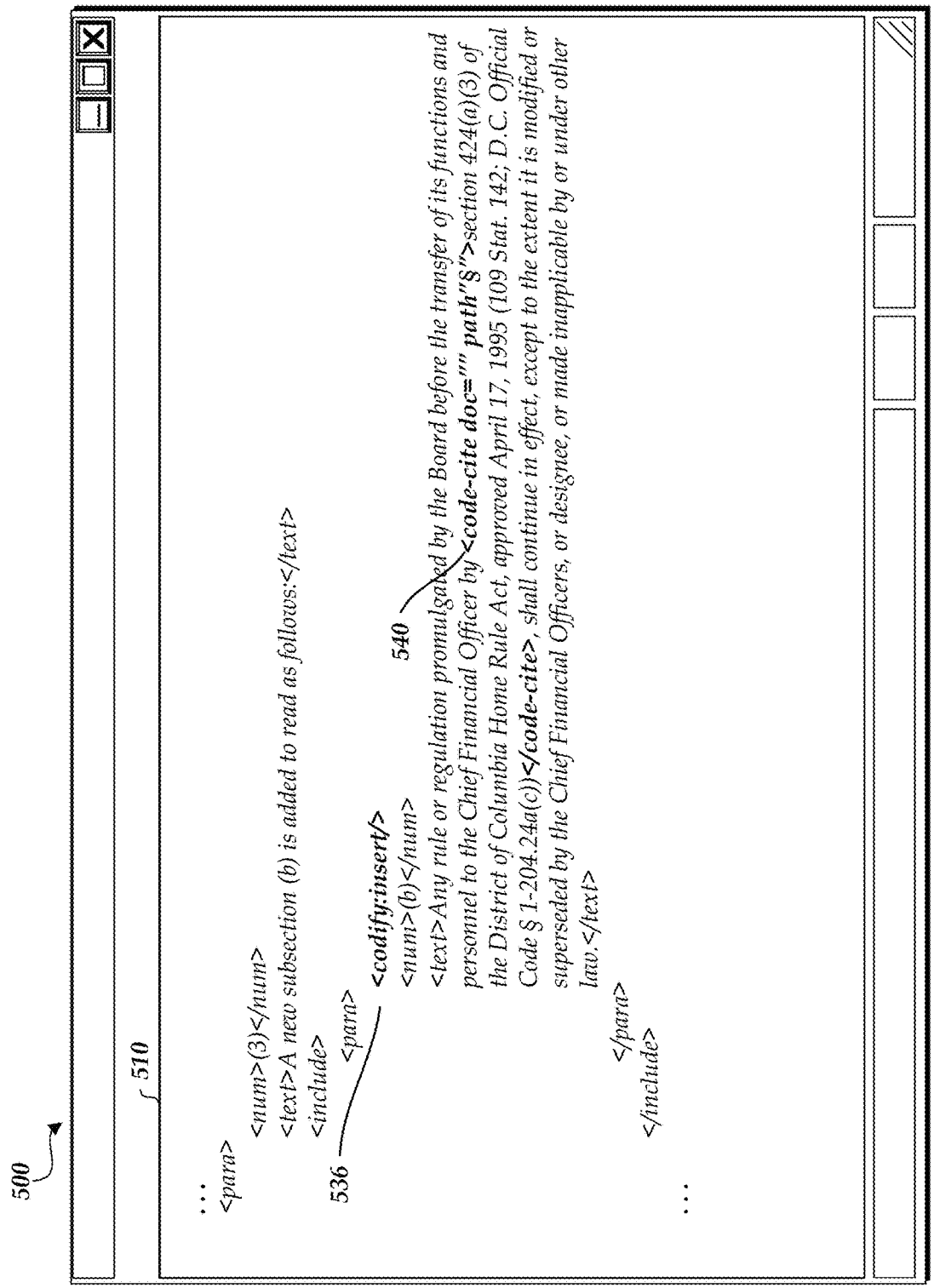
Figure 6A:
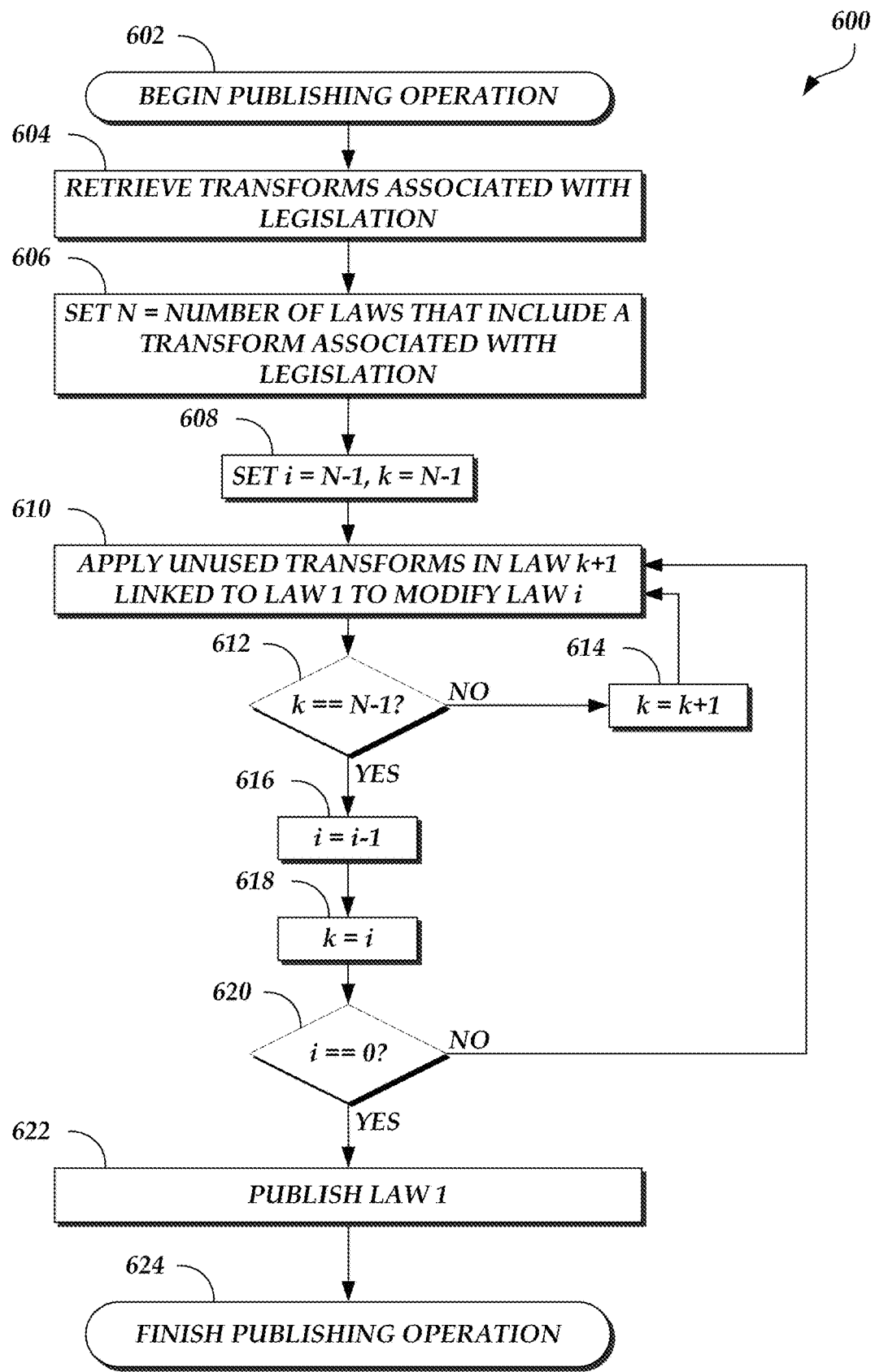
FIG. 6A is a flow diagram depicting a publishing operation illustratively implemented by a publishing device and/or legislation publishing system, according to one embodiment.

A user may browse through highlighted text and confirm or deny that the highlighted text corresponds to a law citation. If the highlighted text does correspond to a law citation, the user may make a selection that automatically converts the highlighted text into a <code-cite> tag in which the user (or codification application 134 or legislation codifier 122) can insert a reference to a particular section and/or approved law in the "doc" and "path" fields. As an illustrative example, the user may identified text 538 as included a law citation and thus the text 538 is now bracketed by <code-cite> tag 540, as illustrated in FIG. 5I Example Publishing Operations FIG. 6A is a flow diagram depicting a publishing operation 600 illustratively implemented by a publishing device and/or legislation publishing system, according to one embodiment. As an example, the publishing device 130 and/or legislation publishing system 120 of FIG. 1, alone or in combination, can be configured to execute the publishing operation 600. The publishing operation 600 begins at block 602.

At block 604, transforms associated with legislation are retrieved. For example, the specific legislation (e.g., legislative code) may be identified by a user via the user device 102. The transforms may be stored in association with approved laws that correspond to the specified legislative code.

At block 606, a variable N is set equal to the number of laws that include a transform associated with the legislation. For example, the laws associated with the legislation may be those laws that modify a specific title, section, subsection, paragraph, and/or like of the legislative code.

At block 608, variable i is set to be equal to N−1 and variable k is set equal to N−1. Variable i may be used to identify a particular law. Variable k may be used to identify a particular law.

At block 610, unused transforms in law k+1 that are linked to law 1 are applied to modify law i. In other words, transforms that have not yet been applied to any law, that are present in law k+1, and that modify some version of the organic law (e.g., law 1, the law that originally modified the specific title, section, subsection, paragraph, and/or like of the legislative code) are used to modify law i. As an illustrative example, if variable N is 100, then variables i and k are initially 99. The first time that block 610 is executed, unused transforms in law 100 that are linked to law 1 are applied to modify law 99.

At block 612, a determination is made as to whether variable k is equal to N−1. If variable k is equal to N−1 (e.g., transforms from the most recent law corresponding to the organic law have been applied), then the publishing operation 600 proceeds to block 616. Otherwise, if variable k is not equal to N−1 (e.g., transforms from the most recent law corresponding to the organic law have not been applied), then the publishing operation 600 proceeds to block 614. As an illustrative example, if variable N is 100, variable i is 98, and variable k is initially 98, then the publishing operation 600 may proceed to block 614.

At block 614, variable k is incremented by 1. After variable k is incremented by 1, the publishing operation 600 reverts back to block 610. Taking the illustrative example from the preceding paragraph, incrementing variable k by 1 results in variable k equaling 99. By reverting back to block 610, unused transforms in law 100 that are linked to law 1 are then applied to modify law 98. Unused transforms in law 100 may be applied to modify law 98 after unused transforms in law 99 that are linked to law 1 are applied to modify law 98 (e.g., prior to the incremented of variable k by 1).

At block 616, variable i is decremented by 1. By decrementing variable i, transforms will not be applied to the next most recent law linked to the organic law. After variable i is decremented by 1, the publishing operation 600 proceeds to block 618.

At block 618, variable k is set equal to variable i. By setting variable k equal to variable i, the first transforms applied to law i will be transforms from the law linked to the organic law that passed immediately after law i. The next transforms applied to law I will be transforms from the next law linked to the organic law that passed after law i, and so on. After variable k is set equal to variable i, the publishing operation 600 proceeds to block 620.

At block 620, a determination is made as to whether variable i is equal to 0. If variable i is equal to 0 (e.g., all transforms have been applied and the organic law has been modified), then the publishing operation 600 proceeds block 622. Otherwise, if variable i is not equal to 0 (e.g., all transforms have not been applied and/or the organic law has not been modified), then the publishing operation 600 reverts back to block 610.

At block 622, law 1 is published. For example, the application of the transforms may result in a modified law 1. The transforms in modified law 1 can be applied to form transformed markup language code. The transformed markup language code can then be published. After law 1 is published, the publication operation 600 ends, as shown at block 624.

Figure 6B:
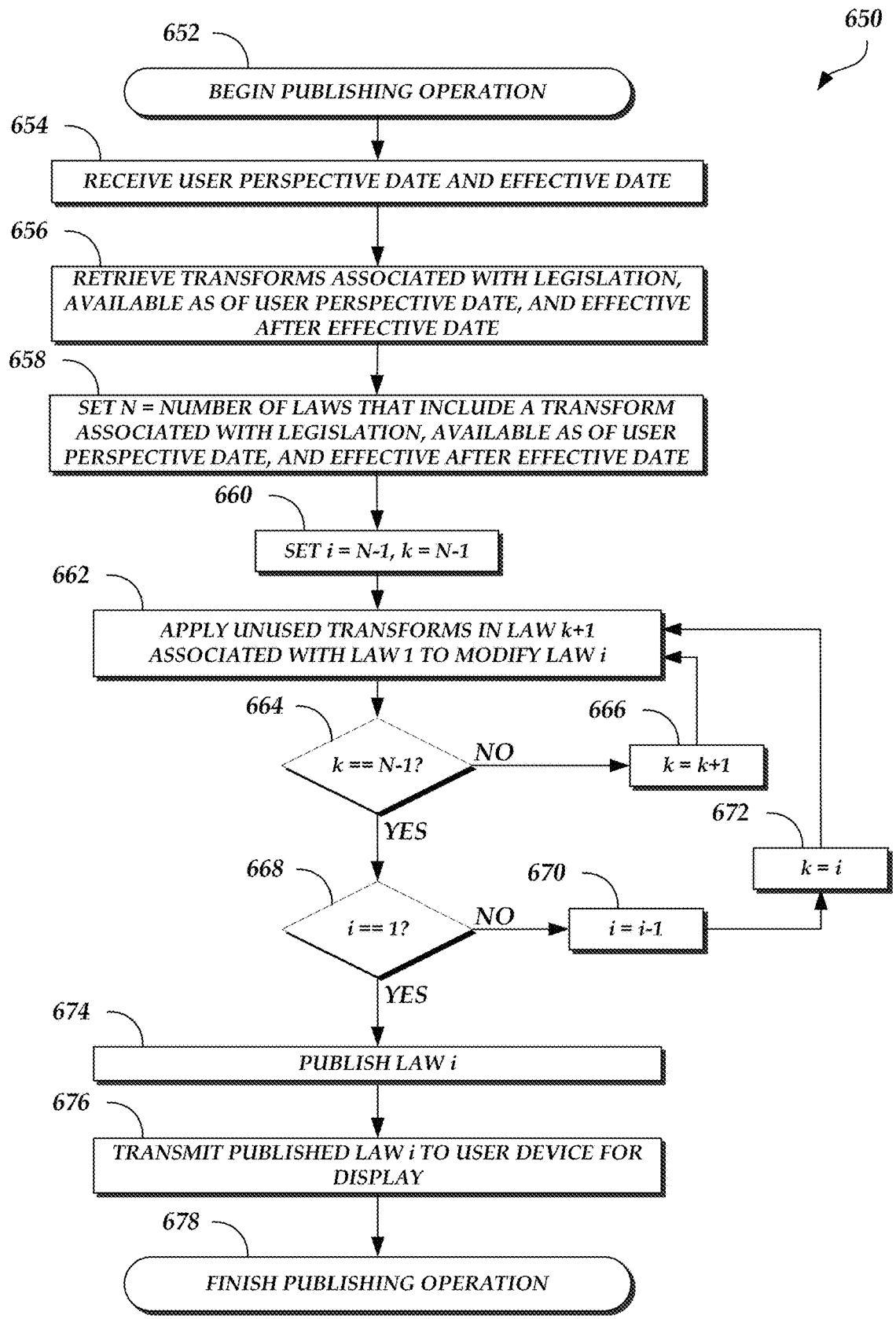
FIG. 6B is another flow diagram depicting a publishing operation illustratively implemented by a publishing device and/or legislation publishing system, according to one embodiment.

FIG. 6B is another flow diagram depicting a publishing operation 650 illustratively implemented by a publishing device and/or legislation publishing system, according to one embodiment. As an example, the publishing device 130 and/or legislation publishing system 120 of FIG. 1, alone or in combination, can be configured to execute the publishing operation 650. The publishing operation 650 differs from the publishing operation 600 in that the publishing device 130 and/or legislation publishing system 120 takes into account an effective date and a user perspective date. The publishing operation 650 begins at block 652.

At block 654, a user perspective date and an effective date are received. For example, the user perspective date may be a date in time that a user pretends to be alive such that the resulting legislative code includes only those laws that were approved as of the date. The effective date may be a date in time at which the law is current such that the resulting legislative code includes only those transforms that are effective as of the date.

At block 656, transforms associated with legislation, available as of the user perspective date, and effective after the effective date are retrieved. For example, the specific legislation (e.g., legislative code) may be identified by a user via the user device 102. The transforms may be stored in association with approved laws that correspond to the specified legislative code and/or in association with an effective time period and/or introduction date.

At block 658, a variable N is set equal to the number of laws that include a transform associated with the legislation, available as of the user perspective date, and effective after the effective date. For example, the laws associated with the legislation may be those laws that modify a specific title, section, subsection, paragraph, and/or like of the legislative code.

At block 660, variable i is set to be equal to N−1 and variable k is set equal to N−1. Variable i may be used to identify a particular law. Variable k may be used to identify a particular law.

At block 662, unused transforms in law k+1 that are linked to law 1 are applied to modify law i. In other words, transforms that have not yet been applied to any law, that are present in law k+1, and that modify some version of the organic law (e.g., law 1, the law that originally modified the specific title, section, subsection, paragraph, and/or like of the legislative code) are used to modify law i. As an illustrative example, if variable N is 100, then variables i and k are initially 99. The first time that block 662 is executed, unused transforms in law 100 that are linked to law 1 are applied to modify law 99.

At block 664, a determination is made as to whether variable k is equal to N−1. If variable k is equal to N−1 (e.g., transforms from the most recent law corresponding to the organic law have been applied), then the publishing operation 650 proceeds to block 668. Otherwise, if variable k is not equal to N−1 (e.g., transforms from the most recent law corresponding to the organic law have not been applied), then the publishing operation 650 proceeds to block 666. As an illustrative example, if variable N is 100, variable i is 98, and variable k is initially 98, then the publishing operation 650 may proceed to block 666.

At block 666, variable k is incremented by 1. After variable k is incremented by 1, the publishing operation 650 reverts back to block 662. Taking the illustrative example from the preceding paragraph, incrementing variable k by 1 results in variable k equaling 99. By reverting back to block 662, unused transforms in law 100 that are linked to law 1 are then applied to modify law 98. Unused transforms in law 100 may be applied to modify law 98 after unused transforms in law 99 that are linked to law 1 are applied to modify law 98 (e.g., prior to the incremented of variable k by 1).

At block 668, a determination is made as to whether variable i is equal to 1. If variable i is equal to 1 (e.g., all transforms have been applied and the organic law has been modified), then the publishing operation 650 proceeds block 674. Otherwise, if variable i is not equal to 0 (e.g., all transforms have not been applied and/or the organic law has not been modified), then the publishing operation 650 proceeds to block 670.

At block 670, variable i is decremented by 1. By decrementing variable i, transforms will not be applied to the next most recent law linked to the organic law. After variable i is decremented by 1, the publishing operation 650 proceeds to block 672.

At block 672, variable k is set equal to variable i. By setting variable k equal to variable i, the first transforms applied to law i will be transforms from the law linked to the organic law that passed immediately after law i. The next transforms applied to law I will be transforms from the next law linked to the organic law that passed after law i, and so on. After variable k is set equal to variable i, the publishing operation 650 reverts back to block 662.

At block 674, law 1 is published. For example, the application of the transforms may result in a modified law 1. The transforms in modified law 1 can be applied to form transformed markup language code. The transformed markup language code can then be published.

At block 676, the published law 1 is transmitted to a user device for display. For example, the published law 1 may be transmitted as a text document, a PDF, a markup language code file, a content page, and/or the like. After published law 1 is transmitted to the user device, the publication operation 650 ends, as shown at block 678.

Example Published Legislation User Interfaces

Figure 7A:
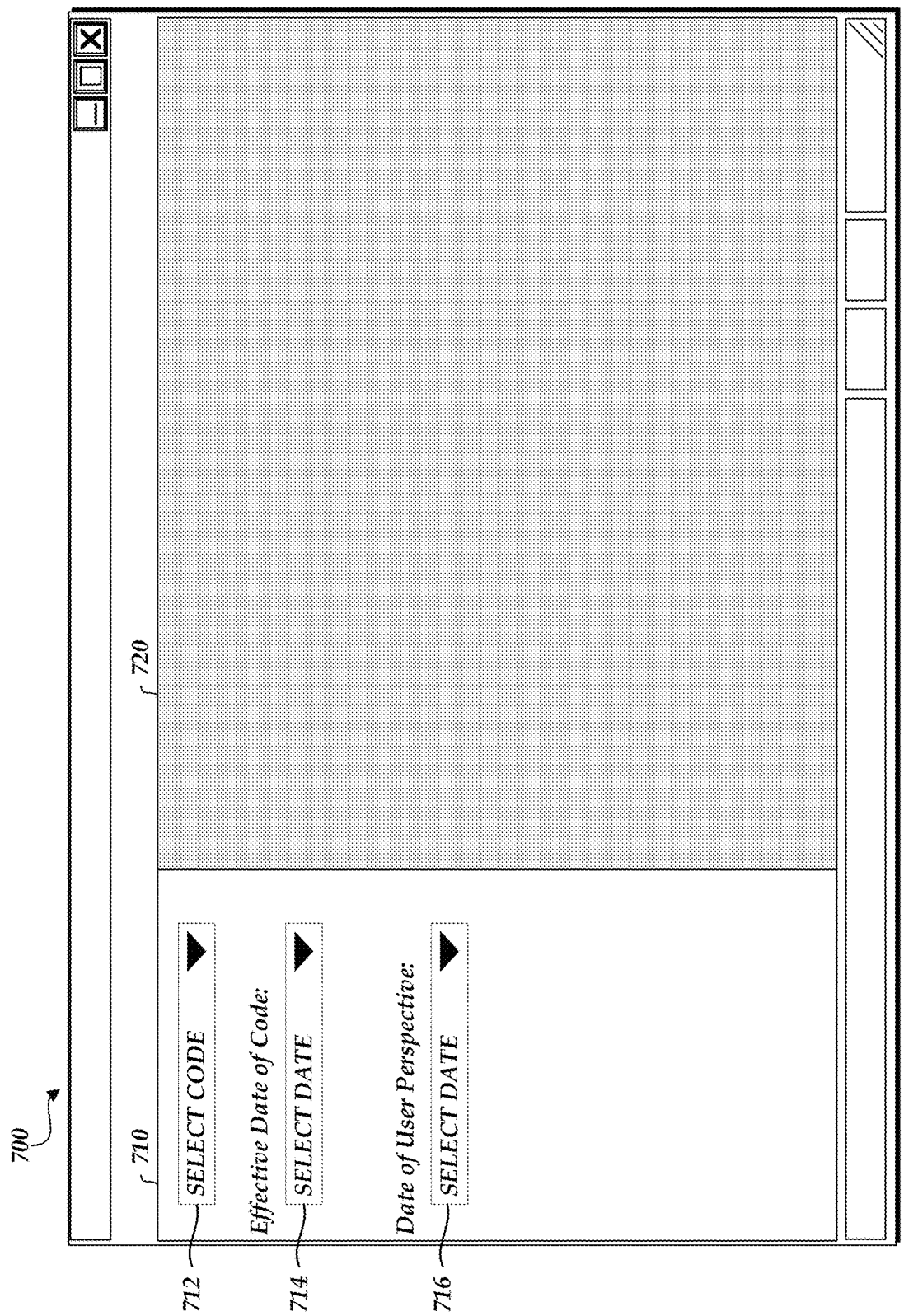
FIGS. 7A-7B illustrate a user interface displaying published legislation.
Figure 7B:
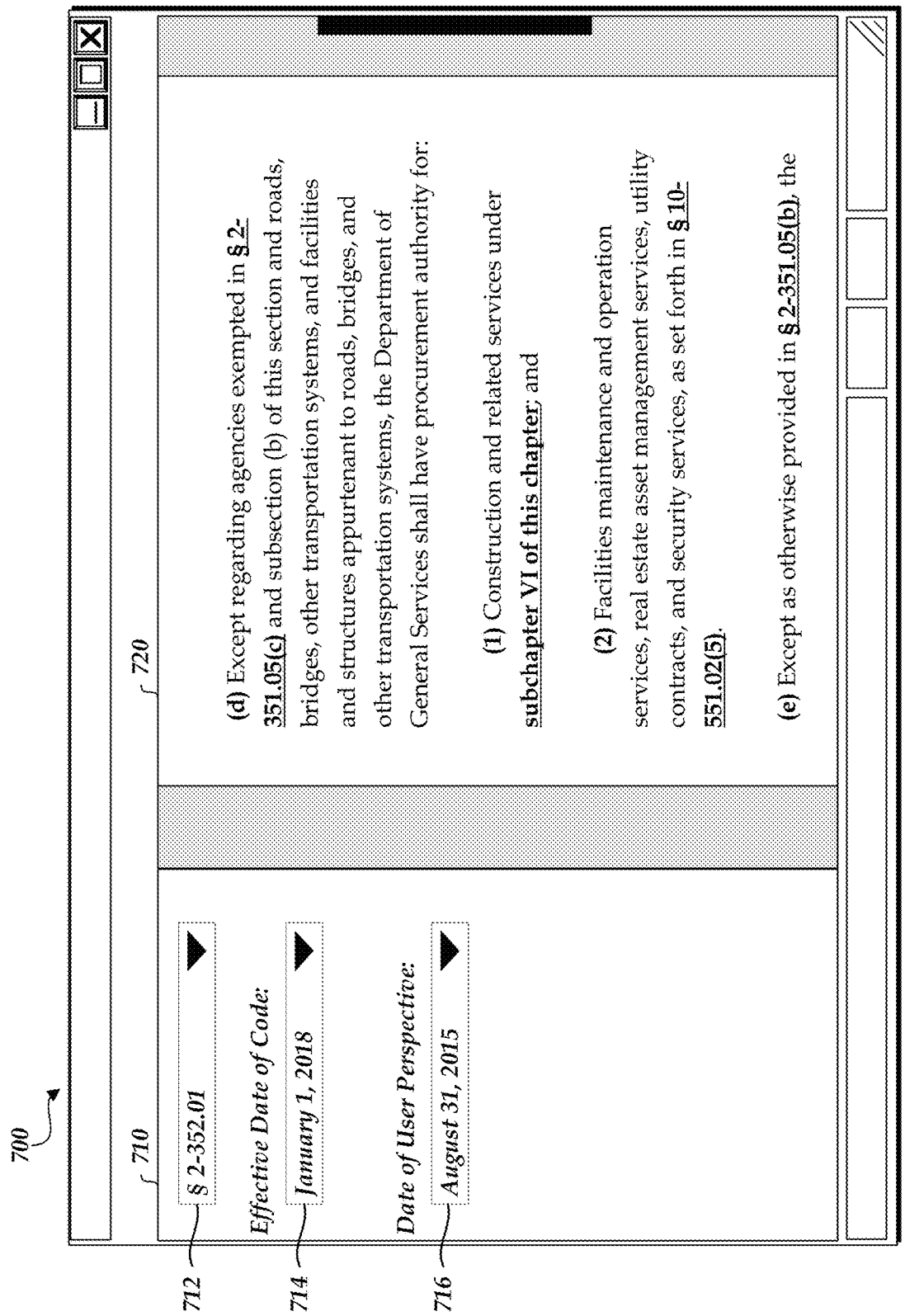

FIGS. 7A-7B illustrate a user interface 700 displaying published legislation. The user interface 700 may be displayed by the publishing device 130 and/or the user device 102 (e.g., via user interface data provided by the legislation publishing system 120).

As illustrated in FIG. 7A, the user interface includes a window 710 and a window 720. The window 710 includes a code selection button 712, an effective date selection button 714, and a user perspective date selection button 716. The code selection button 712 may allow a user to select a title, section, subsection, paragraph, etc. of a legislative code to view in the window 720. The effective date selection button 714 may allow the user to select an effective date of the selected legislative code (e.g., a state of the legislative code as of the effective date). The user perspective date selection button 716 may allow the user to select the date on which a user pretends to be alive such that the selected legislative code includes only those laws that were approved as of that date.

As illustrated in FIG. 7B, the user has selected a specific section of the legislative code, an effective date, and a user perspective date in the window 710. The publishing device 130 and/or the code publisher 123 may receive this information and generate the corresponding legislative code (e.g., as described above with respect to the publishing operation 650). The publishing device 130 and/or code publisher 123 may then transmit user interface data to the user device 102, where the user interface data includes a copy of the legislative code that conforms to the selections in the window 710. The user interface 700 may display the legislative code in the window 720.

The legislative code displayed in the window 720 may include links to other titles, sections, subsections, paragraphs, etc. of the legislative code (e.g., the text bolded and underlined). Selection of a link may cause the user interface 700 to display the selected title, section, subsection, paragraph, etc. (e.g., where the selected portion of the legislative code is effective as of the effective date and from the perspective of a user on the user perspective date selected in the window 710). The publishing device 130 and/or code publisher 123 may receive an indication of which link was selected and generate the selected portion of the legislative code such that the user interface 700 can display the selection portion.

The task of navigating through various versions of legislative code (e.g., to identify the state of the legislative code as of a certain date) can be burdensome and time consuming for users, especially if the users are not aware of all of the laws that may have been passed that affect the code. Typically, a user may be required to navigate through various electronic resources that indicate what laws were passed, and further navigate through various electronic versions of the laws to attempt to identify changes made to the legislative code (e.g., the user may be required to select hyperlinks that link to various laws, select hyperlinks within an electronic version of a law that reference other laws, etc.). The user may then have to open different windows in a user interface to compare different laws. Given that many laws are related and reference other laws or prior version of laws, the user may be required to navigate through several different layers (e.g., different laws, different sections, different subsections, etc.) to even attempt to identify the desired state of the legislative code. This navigation can include selecting various links and/or opening different windows within a user interface. Further, in many cases, while laws may be chronological, the laws are not necessarily accurately or intuitively organized, requiring the user to perform additional navigation or keyword searching. Thus, the user frequently has to perform numerous navigational steps to even attempt to identify the desired state of the legislative code.

The user interface 700 of FIGS. 7A-7B, however, significantly reduces this problem, allowing users to view a desired state of the legislative code with fewer steps. For example, in the embodiments described herein, the user merely provides an identification of a legislative code via the code selection button 712, an effective date via the effective data selection button 714, and a user perspective data via the user perspective data selection button 716. The user interface 700 then automatically presents the desired state of the legislative code in the window 720. This allows the user to bypass the navigational structure of the electronic resources storing electronic versions of the laws and/or the laws themselves. Accordingly, programmatically identifying and presenting to the user the desired state of the legislative code via a few user inputs results in an improved user interface that improves the speed of the user's navigation. This can be particularly true for computing devices with small screens, where a smaller amount of information can be displayed to the user at any given time and therefore navigation of larger documents and/or large number of electronic resources is more difficult.

Example Legislation Publication Routine

Figure 8:
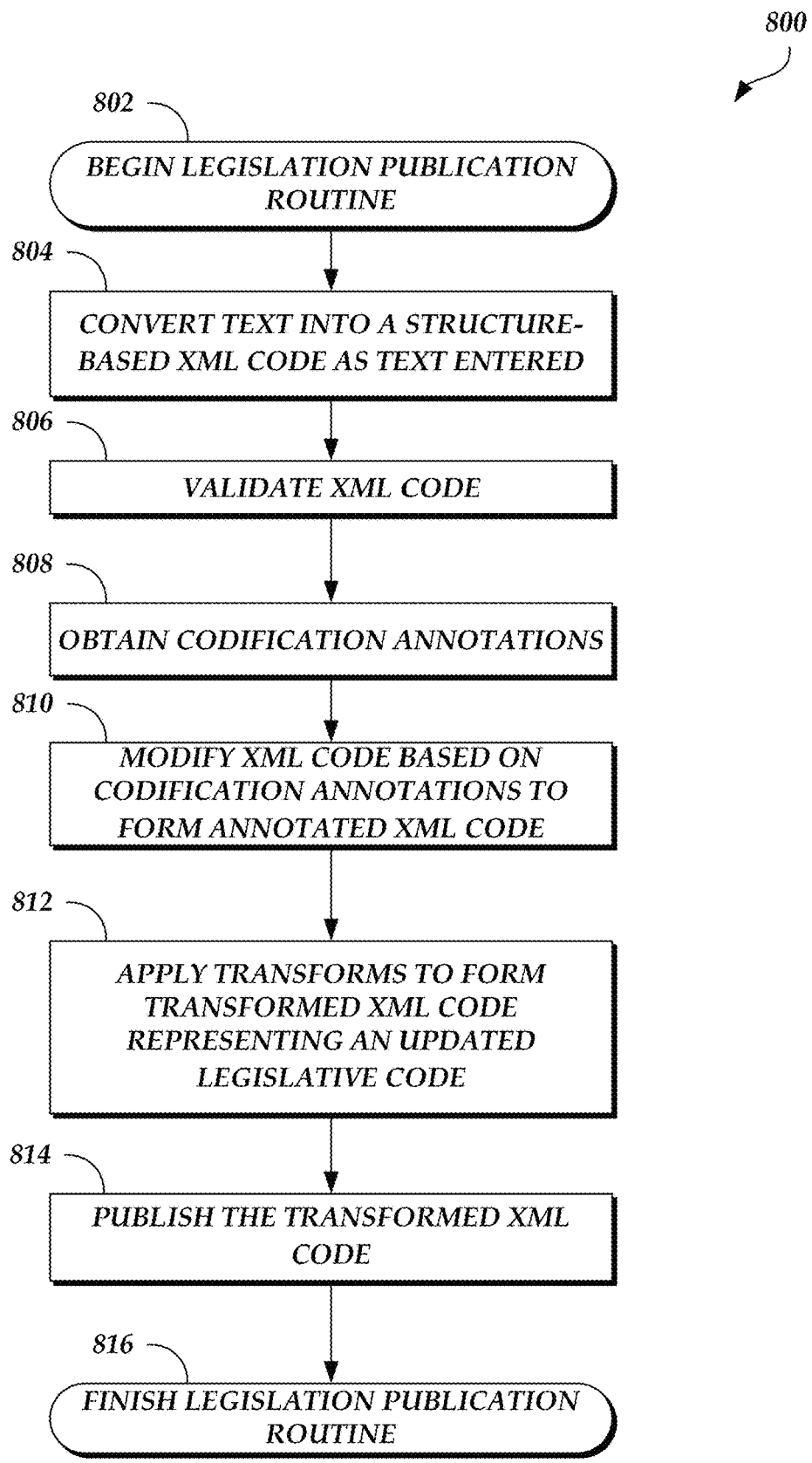
FIG. 8 is a flow diagram depicting a legislation publication routine illustratively implemented by a publication device and/or a legislation publication system, according to one embodiment.

FIG. 8 is a flow diagram depicting a legislation publication routine 800 illustratively implemented by a publication device and/or a legislation publication system, according to one embodiment. As an example, the publication device 130 and/or the legislation publication system 120 of FIG. 1 can be configured to execute the legislation publication routine 800. The legislation publication routine 800 begins at block 802.

At block 804, text is converted into structure-based XML code as text is entered. For example, the publication device 130 and/or legislation publication system 120 may repeat this process each time an API call is received (e.g., from the publishing device 130 or from a network-accessible text editor provided by the legislation drafter and validator 121) indicating that the cursor has moved and/or that the text document has changed.

At block 806, the XML code is validated. For example, the publication device 130 and/or legislation publication system 120 can compare the XML code with retrieved rules corresponding to a style guide to ensure that the XML code conforms with the rules. If any rule violations exist, the publication device 130 and/or legislation publication system 120 can display or cause the enhanced text editor to display the violations and request correction and/or permission to automatically correct the violations.

At block 808, codification annotations are obtained. For example, the codification annotations may be received via user input or determined by the publication device 130 and/or legislation publication system 120 using a machine learning process.

At block 810, the XML code is modified based on the codification annotations to form annotated XML code. For example, the publication device 130 and/or legislation publication system 120 can then store the annotated XML code as one or more transforms in the transforms data store 124.

At block 812, transforms are applied to form transformed XML code representing an updated legislative code. For example, the transforms that are applied may be transforms that are linked to the organic code corresponding to the desired portion of the legislative code, that are effective as of a selected date, and/or that correspond with laws that were approved as of a selected date.

At block 814, the transformed XML code is published. For example, the transformed XML code may be published as a text document, a PDF document, XML code, a content page, and/or the like. After the transformed XML code is published, the legislation publication routine 800 ends, as shown at block 816.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to select and view a portion of or all of a legislative code. The application may also allow the user to select an effective date of the legislative code and a date from which a user is perceiving the legislative code.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for publishing a first legal document using artificial intelligence, the system comprising:
   a user device; and
   a computing system comprising one or more computing devices, wherein the computing system is configured with specific computer-executable instructions to:
     convert text into markup language code as a user enters the text, wherein the markup language code represents a second legal document that recites changes to the first legal document;
     validate the markup language code in response to an indication that the entering of text is complete;
     obtain transformation annotations, wherein each transformation annotation comprises a markup language code tag that, when inserted into the markup language code, identifies how a portion of the second legal document should modify text of the first legal document;
     insert the transformation annotations into the markup language code to form one or more first instructions, wherein each first instruction, when executed, causes modification to the text of the first legal document in accordance with one of the transformation annotations;
     execute a second instruction associated with a third legal document that is more recent than the second legal document and that recites changes to the first legal document, wherein a fourth legal document is more recent than the second legal document and less recent than the third legal document, wherein the fourth legal document is associated with a third instruction, and wherein execution of the second instruction causes modification to the fourth legal document to form a modified third instruction;

execute the modified third instruction after execution of the second instruction, wherein execution of the modified third instruction causes modification to the second legal document to form one or more modified first instructions;

execute a fourth instruction associated with the third legal document, wherein execution of the fourth instruction causes modification to the modified second legal document to form one or more second modified first instructions;

execute at least some of the one or more second modified first instructions after execution of the fourth instruction to form transformed markup language code, wherein the transformed markup language code represents an updated version of the first legal document;

publish the transformed markup language code; and transmit the published transformed markup language code to the user device for display.

2. The system of claim 1, wherein the computing system is further configured with specific computer-executable instructions to auto-complete at least a portion of the text entered by the user using a machine learning model trained using at least one of a training set of properly formatted citations to at least one of laws or legislative codes or a training set of at least one of existing laws or legislative codes.

3. The system of claim 1, wherein the computing system is further configured with specific computer-executable instructions to predict at least some of the transformation annotations using a machine learning model trained using a training set of second markup language code and corresponding transformation annotations.

4. The system of claim 1, wherein the computing system is further configured with specific computer-executable instructions to:

receive, from the user device, an effective date and a user perspective date;

identify a first set of the one or more second modified first instructions that are effective as of the effective date and that correspond to a legal document approved prior to or on the user perspective date; and execute the first set of the one or more modified first instructions to form the transformed markup language code.

5. The system of claim 1, wherein the computing system is further configured with specific computer-executable instructions to validate the markup language code using one or more rules corresponding to a style guide of a jurisdiction.

6. The system of claim 1, wherein the markup language code comprises structural annotations.

7. The system of claim 1, wherein the markup language code comprises extensible markup language (XML) code.

8. A computer-implemented method of publishing a first legal document using artificial intelligence, the computer-implemented method comprising:

as implemented by one or more computing devices configured with specific computer-executable instructions, converting text into markup language code as the text is entered in an application executing on one of the one or more computing devices or a user device, wherein the markup language code represents a second legal document that recites changes to the first legal document;

validating the markup language code in response to a user input;

obtaining transformation annotations, wherein each transformation annotation comprises a markup language code tag that, when inserted into the markup language code, identifies how a portion of the second legal document should modify text of the first legal document;

inserting the transformation annotations into the markup language code to form one or more first instructions, wherein each first instruction, when executed, causes modification to the text of the first legal document in accordance with one of the transformation annotations;

executing a second instruction associated with a third legal document that is more recent than the second legal document and that recites changes to the first legal document, wherein a fourth legal document is more recent than the second legal document and less recent than the third legal document, wherein the fourth legal document is associated with a third instruction, and wherein execution of the second instruction causes modification to the fourth legal document to form a modified third instruction;

executing the modified third instruction after execution of the second instruction, wherein execution of the modified third instruction causes modification to the second legal document to form one or more modified first instructions;

executing a fourth instruction associated with the third legal document, wherein execution of the fourth instruction causes modification to the modified second legal document to form one or more second modified first instructions;

executing at least some of the one or more second modified first instructions after execution of the fourth instruction to form transformed markup language code, wherein the transformed markup language code represents an updated version of the first legal document; and publishing the transformed markup language code for display.

9. The computer-implemented method of claim 8, further comprising auto-completing at least a portion of the entered text using a machine learning model trained using at least one of a training set of properly formatted citations to at least one of laws or legislative codes or a training set of at least one of existing laws or legislative codes.

10. The computer-implemented method of claim 8, further comprising predicting at least some of the transformation annotations using a machine learning model trained using a training set of second markup language code and corresponding transformation annotations.

11. The computer-implemented method of claim 8, wherein applying at least some of the one or more transforms further comprises:

receiving an effective date and a user perspective date;

identifying a first set of the one or more second modified first instructions that are effective as of the effective date and that correspond to a legal document approved prior to or on the user perspective date; and executing the first set of the one or more modified first instructions to form the transformed markup language code.

12. The computer-implemented method of claim 8, wherein validating the markup language code further comprises to validating the markup language code using one or more rules corresponding to a style guide of a jurisdiction.

13. The computer-implemented method of claim 8, wherein the markup language code comprises extensible markup language (XML) code.

14. Non-transitory, computer-readable storage media comprising computer-executable instructions for publishing a first legal document, wherein the computer-executable instructions, when executed by a computer system, cause the computer system to:
- convert entered text into markup language code, wherein the markup language code represents a second legal document that recites changes to the first legal document;
- validate the markup language code;
- insert transformation annotations into the markup language code to form one or more first instructions, wherein each transformation annotation comprises a markup language code tag that, when inserted into the markup language code, identifies how a portion of the second legal document should modify text of the first legal document, and wherein each first instruction, when executed, causes modification to the text of the first legal document in accordance with one of the transformation annotations;
- execute a second instruction associated with a third legal document that is more recent than the second legal document and that recites changes to the first legal document, wherein a fourth legal document is more recent than the second legal document and less recent than the third legal document, wherein the fourth legal document is associated with a third instruction, and wherein execution of the second instruction causes modification to the fourth legal document to form a modified third instruction;
- execute the modified third instruction after execution of the second instruction, wherein execution of the modified third instruction causes modification to the second legal document to form one or more modified first instructions;
- execute a fourth instruction associated with the third legal document, wherein execution of the fourth instruction causes modification to the modified second legal document to form one or more second modified first instructions;
- execute at least some of the one or more modified first instructions after execution of the fourth instruction to form transformed markup language code, wherein the transformed markup language code represents an updated version of the first legal document; and
- publish the transformed markup language code for display.

15. The non-transitory, computer-readable storage media of claim 14, wherein the computer-executable instructions further cause the computer system to auto-complete at least a portion of the entered text using a machine learning model trained using at least one of a training set of properly formatted citations to at least one of laws or legislative codes, or a training set of at least one of existing laws or legislative codes.

16. The non-transitory, computer-readable storage media of claim 14, wherein the computer-executable instructions further cause the computer system to predict at least some of the transformation annotations using a machine learning model trained using a training set of second markup language code and corresponding transformation annotations.

\* \* \* \* \*